(12) United States Patent
Higashioji et al.

(10) Patent No.: US 8,153,732 B2
(45) Date of Patent: Apr. 10, 2012

(54) BIAXIALLY ORIENTED POLYPHENYLENE SULFIDE FILM

(75) Inventors: Takuji Higashioji, Kyoto (JP); Tetsuya Machida, Suita (JP); Masatoshi Ohkura, Otsu (JP); Yasuyuki Imanishi, Otsu (JP); Atsushi Ishio, Nagoya (JP); Megumi Yamada, Ritto (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/067,220

(22) Filed: May 17, 2011

(65) Prior Publication Data

US 2011/0224384 A1    Sep. 15, 2011

Related U.S. Application Data

(62) Division of application No. 11/667,384, filed as application No. PCT/JP2005/018311 on Oct. 4, 2005, now abandoned.

(30) Foreign Application Priority Data

Nov. 12, 2004 (JP) .................... 2004-328716
Jan. 18, 2005  (JP) .................... 2005-010140

(51) Int. Cl.
*C08L 77/00* (2006.01)
*C08L 81/02* (2006.01)
*C08L 79/00* (2006.01)

(52) U.S. Cl. .......... 525/423; 525/66; 525/181; 525/424; 525/430; 525/431; 525/436; 525/537

(58) Field of Classification Search .............. 525/66, 525/181, 23, 424, 436, 537, 430, 431
See application file for complete search history.

(56) References Cited

FOREIGN PATENT DOCUMENTS

| JP | 10-046028 | * | 2/1998 |
|---|---|---|---|
| JP | 2001-261959 | | 9/2001 |
| JP | 2006-137852 | | 6/2006 |
| JP | 2006-321977 | | 11/2006 |
| JP | 2007-002221 | | 1/2007 |
| WO | 2005-085331 A1 | | 9/2005 |
| WO | 2006-046795 A1 | | 5/2006 |
| WO | 2006-051658 | | 5/2006 |

* cited by examiner

*Primary Examiner* — Ana Woodward
(74) *Attorney, Agent, or Firm* — Kubovcik & Kubovcik

(57) ABSTRACT

A biaxially oriented polyphenylene sulfide film contains polyphenylene sulfide and polyether imide, wherein the contents of the polyphenylene sulfide and the polyether imide are 70 to 99 parts by weight and 1 to 30 parts by weight respectively when the total amount of the polyphenylene sulfide and the polyether imide is taken as 100 parts by weight, and further contains a compound having one or more groups selected from an epoxy group, an amino group and an isocyanate group as a compatibilizing agent in an amount of 0.1 to 10 parts by weight based on 100 parts by weight of the polyphenylene sulfide and polyether imide in total, and the polyether imide forms a dispersed phase with an average particle diameter of 10 to 500 nm and the biaxially oriented polyphenylene sulfide film exhibits a tensile elongation at break of 110 to 250% in both the longitudinal direction and width direction.

3 Claims, No Drawings

BIAXIALLY ORIENTED POLYPHENYLENE SULFIDE FILM

This application is a division of application Ser. No. 11/667,384, filed Jul. 6, 2007 now abandoned, which is a 371 of international application PCT/JP2005/018311, filed Oct. 4, 2005, which claims priority based on Japanese Patent Application Nos. 2004-328716 and 2005-010140, filed Nov. 12, 2004, and Jan. 18, 2005, respectively, and which are incorporated herein by reference.

TECHNICAL FIELD

The present invention relates to a biaxially oriented polyarylene sulfide film and a laminated polyarylene sulfide sheet, which have excellent heat resistance, dimensional stability, electrical properties and chemical resistance. The film or sheet of the present invention can be used in an electrical insulating material for a motor, a transformer, an insulated cable etc., a molding material, a circuit board material, a step/release film such as circuit/optical element etc., a protective film, a lithium ion battery material, a fuel battery material, a speaker diaphragm, etc. More specifically, the present invention relates to a biaxially oriented polyarylene sulfide film which can be preferably used in an electrical insulating material for a hot-water supplier motor, a motor for car air conditioner and a driving motor used in a hybrid car, and a speaker diaphragm for cell-phone.

BACKGROUND ART

In electrical insulating materials for motors, it has recently demanded to have heat resistance at high temperature and hydrolysis resistance. For example, new alternatives for cooling medium have been proposed as electrical insulating materials for motors used in refrigerators and air conditioners, in connection with abolition of specific chlorofluorocarbons from an environmental problem. Such cooling medium and its compatible lubricant easily absorb water, so in the above-mentioned insulating materials, there is a demand for hydrolysis resistance in addition to heat resistance. In electrical insulating materials for motors used in hybrid cars, water is infiltrated into the materials under usage environment, so there is a demand for hydrolysis resistance in addition to heat resistance.

A polyarylene sulfide film has excellent features such as heat resistance, flame retardancy, rigidity, chemical resistance, electrical insulating properties and low hygroscopicity and is used particularly preferably in electrical instruments, electronics, machine parts and automobile parts.

In recent years, application of a polyphenylene sulfide (hereinafter abbreviated sometimes as PPS) film to electrical insulating materials proceeds to make use of its electrical insulating properties and excellent low hygroscopicity. For example, (1) use of a biaxially oriented film as an electrical insulating material is known (see Patent Document 1). Further, (2) a non-oriented PPS sheet is also known (see Patent Documents 2 and 3). In addition, (3) a laminate comprising a biaxially oriented PPS layer laminated on a non-oriented PPS layer without an adhesive is known (see Patent Documents 4 and 5).

However, the conventional film, sheet, laminated film and laminate described above have the following problems. That is, the film in the item (1) above may be unsatisfactory in tensile elongation at break, impact resistance and tear propagation strength, and when used for example as a motor slot liner or as a wedge, causes film breakage or delamination in some cases. The non-oriented PPS sheet in the item (2) above is excellent in tear propagation strength, but is extremely poor in tensile elongation at break and lowers its strength rapidly at a temperature near to the melting point, thus significantly deteriorating shape retention in some cases. The laminate in the item (3) above is laminated without an adhesive to increase the film thickness thereby increasing the stiffness of the film, but the adhesive strength of laminate interface is insufficient so the tensile elongation at break is low thus causing a problem in processability in some cases.

As described above, the polyphenylene sulfide film is poor in ductility and tensile elongation at break, thus making its applications limited at present, and its improvement is strongly desired. For a method of improving its ductility, a resin composition or a film having other thermoplastic resin mixed in polyphenylene sulfide is proposed. For example, a composition comprising nylon 11 and nylon 12 dispersed as particles having an average diameter of 1 μm or less (see Patent Document 6), a composition comprising PPS, polyamide and epoxy resin (see Patent Document 7), a composition comprising PPS and polyamide (see Patent Documents 8 and 9), a film comprising PPS and polyether imide (see Patent Document 10), a film comprising PPS and polysulfone (see Patent Document 11) etc. are disclosed, but a resin composition or a film having thermoplastic resin such as polyamide or polysulfone dispersed ultra-finely in the range of 10 to 500 nm in PPS is not described. On the other hand, a resin composition having thermoplastic resin such as polyamide dispersed ultra-finely in a characteristically dispersed state is proposed (see Patent Document 12). However, this resin composition has formed a structure by shear field-dependent phase solubilization/phase separation wherein the resin is destabilized again in a non-shear state to cause phase separation after it is once compatibilized in a shear field at the time of melt-kneading, and when a sheet or film is formed, its structural stability is not sufficient in some cases, and the appropriate method for forming a biaxially oriented film is not described.

Patent Document 1: Japanese Unexamined Patent Publication No. 1980-35456
Patent Document 2: Japanese Unexamined Patent Publication No. 1981-34426
Patent Document 3: Japanese Unexamined Patent Publication No. 1982-121052
Patent Document 4: Japanese Unexamined Patent Publication No. 1990-45144
Patent Document 5: Japanese Unexamined Patent Publication No. 1992-319436
Patent Document 6: Japanese Unexamined Patent Publication No. 1991-81367
Patent Document 7: Japanese Unexamined Patent Publication No. 1984-155462
Patent Document 8: Japanese Unexamined Patent Publication No. 1988-189458
Patent Document 9: Japanese Unexamined Patent Publication No. 2001-302918
Patent Document 10: Japanese Unexamined Patent Publication No. 1992-146935
Patent Document 11: Japanese Unexamined Patent Publication No. 1987-121761
Patent Document 12: Japanese Unexamined Patent Publication No. 2003-113307

DISCLOSURE OF INVENTION

Problem to be Solved by the Invention

The object of the present invention is to provide a biaxially oriented polyarylene sulfide film excellent in molding processability by improving the tensile elongation at break of a biaxially oriented polyarylene sulfide film having excellent heat resistance, dimensional stability, electrical properties, and chemical resistance. The film or sheet of the present invention can be used in an electrical insulating material for a motor, a transformer, an insulated cable etc., a molding material, a circuit board material, a step/release film for circuit/optical element etc., a protective film, a lithium ion battery material, a fuel battery material, a speaker diaphragm etc. and more specifically, it can be used in an electrical insulating material for a hot-water supplier motor, a motor for car air conditioner and a driving motor used in a hybrid car, and a speaker diaphragm for cell-phone.

The object of the laminated polyarylene sulfide sheet of the present invention is to improve molding processability by improving tensile elongation at break. Particularly, the object of the laminated polyarylene sulfide sheet of the present invention is to prevent an electrical insulating material for a hot-water supplier motor and a motor for car air conditioner and a driving motor used in a hybrid car from generating film cracking upon bending processing, thus making it usable preferably as a slot or wedge.

Means for Solving the Problem

To achieve the object, the present invention has the following constitution:
(1) a biaxially oriented polyarylene sulfide film comprising polyarylene sulfide and other thermoplastic resin A different from the polyarylene sulfide, wherein the contents of the polyarylene sulfide and the thermoplastic resin A are 70 to 99 parts by weight and 1 to 30 parts by weight respectively when the total amount of the polyarylene sulfide and the thermoplastic resin A is taken as 100 parts by weight and the resin thermoplastic A forms a dispersed phase with an average particle diameter of 10 to 500 nm and the biaxially oriented polyarylene sulfide film exhibits a tensile elongation at break of 110 to 250% in at least one of the longitudinal direction and width direction and a tensile elongation at break of 80 to 250% in the other direction;
(2) the biaxially oriented polyarylene sulfide film according to the above-mentioned (1), wherein the polyarylene sulfide is polyphenylene sulfide;
(3) the biaxially oriented polyarylene sulfide film according to the above-mentioned (1) or (2), wherein the thermoplastic resin A is at least one kind of polymer selected from polyamide, polyether imide, polyether sulfone and polysulfone;
(4) the biaxially oriented polyarylene sulfide film according to any of the above-mentioned (1) to (3), wherein the crystal melting heat quantity of the polyarylene sulfide is 20 to 45 (J/g);
(5) the biaxially oriented polyarylene sulfide film according to any of the above-mentioned (1) to (4), wherein the primary dispersion peak temperature at loss tangent of dynamic viscoelasticity at a frequency of 1 Hz is 100 to 135° C.;
(6) a laminated polyarylene sulfide sheet wherein at least one of the outermost layers is a laminated polyarylene sulfide sheet, and the outermost layer is a biaxially oriented polyarylene sulfide film layer (layer a) containing polyarylene sulfide and other thermoplastic resin A different from the polyarylene sulfide, and the contents of the polyarylene sulfide and the thermoplastic resin A in the layer a are 70 to 99 parts by weight and 1 to 30 parts by weight respectively when the total amount of the polyarylene sulfide and the thermoplastic resin A is taken as 100 parts by weight in the layer a and the resin A forms a dispersed phase with an average particle diameter of 10 to 500 nm and the laminated polyarylene sulfide sheet exhibits a tensile elongation at break of 80 to 250% in both the longitudinal direction and width direction;
(7) the laminated polyarylene sulfide sheet according to the above-mentioned (6), wherein the polyarylene sulfide is polyphenylene sulfide;
(8) the laminated polyarylene sulfide sheet according to the above-mentioned (6) or (7), wherein the thermoplastic resin A is at least one kind of polymer selected from the group consisting of polyamide, polyether imide, polyether sulfone and polysulfone;
(9) the laminated polyarylene sulfide sheet according to any of the above-mentioned (6) to (8), wherein the elongation at break in at least one of the longitudinal direction and width direction is 110 to 250%;
(10) the laminated polyarylene sulfide sheet according to any of the above-mentioned (6) to (9), wherein the thickness of a layer other than the outermost layer is 2% to 30% based on the total thickness of the sheet;
(11) the laminated polyarylene sulfide sheet according to any of the above-mentioned (6) to (10), which comprises a non-oriented polyarylene sulfide film layer (layer b) as a layer other than the outermost layer; and
(12) the laminated polyarylene sulfide sheet according to any of the above-mentioned (6) to (10), which comprises a copolymerized polyphenylene sulfide film layer (layer c) as a layer other than the outermost layer.

Effects of the Invention

According to the present invention, a high-quality biaxially oriented polyarylene sulfide film and laminated polyarylene sulfide sheet excellent in molding processability can be provided by improving the tensile elongation at break of a biaxially oriented polyarylene sulfide film having excellent heat resistance, dimensional stability, electrical properties and chemical resistance, as described above. Particularly, there can be obtained a biaxially oriented polyarylene sulfide film and a laminated polyarylene sulfide sheet which can be used preferably in an electrical insulating material for a hot-water supplier motor, a motor for car air conditioner and a driving motor used in a hybrid car, and a speaker diaphragm for cell-phone.

BEST MODE FOR CARRYING OUT THE INVENTION

Hereinafter, the biaxially oriented polyarylene sulfide film of the present invention is described. The biaxially oriented polyarylene sulfide film of the present invention is a biaxially oriented polyarylene sulfide film comprising polyarylene sulfide and other thermoplastic resin A different from the polyarylene sulfide, wherein the contents of the polyarylene sulfide and the thermoplastic resin A are 70 to 99 parts by weight and 1 to 30 parts by weight respectively when the total amount of the polyarylene sulfide and the other thermoplastic resin A is taken as 100 parts by weight. The resin thermoplastic A forms a dispersed phase with an average particle diameter of 10 to 500 nm. The obtained film can thereby be endowed with improved tensile elongation at break.

In the biaxially polyarylene sulfide film wherein the total amount of the polyarylene sulfide and the other thermoplastic resin A is taken as 100 parts by weight, preferably the content of the polyarylene sulfide is 70 to 95 parts by weight and the content of the thermoplastic resin A is 5 to 30 parts by weight, more preferably the content of the polyarylene sulfide is 80 to 95 parts by weight and the content of the thermoplastic resin A is 5 to 20 parts by weight, still more preferably the content of the polyarylene sulfide is 80 to 93 parts by weight and the content of the thermoplastic resin A is 7 to 20 parts by weight. When the thermoplastic resin A is greater than 30 parts by weight, the heat resistance and chemical resistance of the biaxially oriented polyarylene sulfide may be deteriorated. When the thermoplastic resin A is less than 1 part by weight, the tensile elongation at break is hardly improved to confer ductility.

The biaxially oriented polyarylene sulfide film of the present invention has excellent tensile elongation and ductility in addition to excellent heat resistance, chemical resistance and electrical properties inherent in the polyarylene sulfide film. To exhibit such characteristics, it is important that the polyarylene sulfide forms a sea phase (continuous phase or matrix), while the other thermoplastic resin A forms an island phase (dispersed phase). As used herein, the dispersed phase consists of a phase of 2 or more components which can be measured with an optical microscope or an electron microscope, and refers to a phase dispersed as an island phase in a sea phase that is a continuous phase, wherein the sea phase and island phase are contacted with each other via an interface. The shape of the dispersed phase is for example roughly spherical, thin island-shaped, roughly elliptical, or fibrous. The shape may be approximately in the above form, and the interface between the sea phase and island phase may be in a concavo-convex form or multileaf form. The adjacent dispersed phases may be bound to one another. The dispersed phase of the present invention can be confirmed with a transmission electron microscope. It is important that the average particle diameter of dispersed thermoplastic resin A is in the range of 10 to 500 nm, preferably 20 to 300 nm, more preferably 30 to 200 nm, most preferably 30 to 120 nm. The polyarylene sulfide forms a continuous phase by which the film can greatly reflect the excellent heat resistance, chemical resistance and electrical properties of the polyarylene sulfide. By regulating the average particle diameter of the dispersed phase in the above range, a biaxially oriented polyarylene sulfide film excellent in balance between heat resistance and tensile elongation at break can be obtained. When the average particle diameter of the dispersed phase is less than 10 nm, the effect of improvement of tensile elongation in the present invention cannot be sufficiently conferred on the film in some cases. On the other hand, when the average particle diameter of the dispersed phase is greater than 500 nm, the heat resistance may be deteriorated and the film may be broken upon stretching. When the adjacent dispersed phases are bound to one another, the average particle diameter in the form of dispersed, spherical, thin island-shaped, elliptical or fibrous phases is determined.

As used herein, the average particle diameter of the dispersed phase refers to the average diameter in the longitudinal direction, the width direction and the thickness direction of the film. The average particle diameter of the dispersed phase can be measured with a transmission electron microscope. For example, the average particle diameter of the dispersed phase is determined by preparing a sample by ultramicrotomy, then observing it with a transmission electron microscope under the condition of an applied voltage of 100 kV, taking a photograph thereof at 20,000-fold magnification, scanning the obtained photograph as an image with an image analyzer and selecting arbitrary 100 dispersed phases, followed by image processing (measurement method will be described in detail later).

The aspect ratio of the dispersed phase is not particularly limited, and is preferably in the range of 1 to 20. The aspect ratio of the dispersed phase is more preferably in the range of 2 to 15, still more preferably in the range of 2 to 10. Preferably, the aspect ratio of these island components is regulated in the above range so that the biaxially oriented polyarylene sulfide film with improvement in tensile elongation can be easily obtained. The aspect ratio refers to the average major axis/average minor axis ratio of the dispersed phase. The aspect ratio can be measured with a transmission electron microscope. For example, the aspect ratio is determined by preparing a sample by ultramicrotomy, then observing it with a transmission electron microscope under the condition of an applied voltage of 100 kV, taking a photograph thereof at 20,000-fold magnification, scanning the obtained photograph as an image with an image analyzer and selecting arbitrary 100 dispersed phases, followed by image processing (measurement method will be described in detail later).

As used herein, the polyarylene sulfide is a homopolymer or copolymer having a repeating unit —(Ar—S)—. Ar includes structural units represented by the following formula (A) to (K):

(A)

(B)

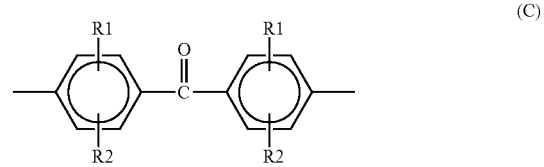

(C)

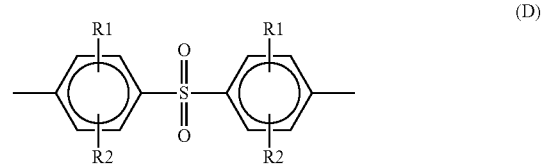

(D)

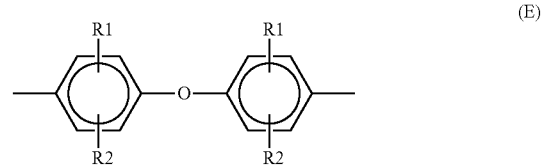

(E)

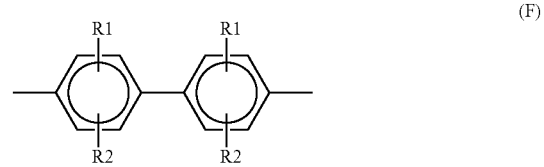

(F)

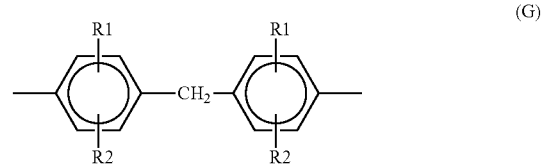

(G)

-continued

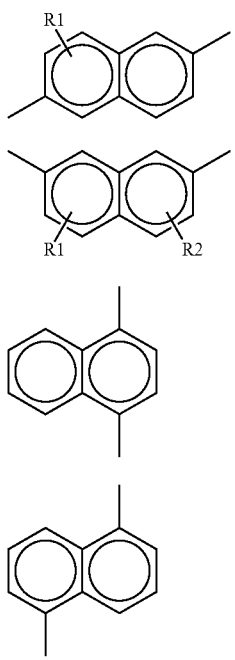

(H)

(I)

(J)

(K)

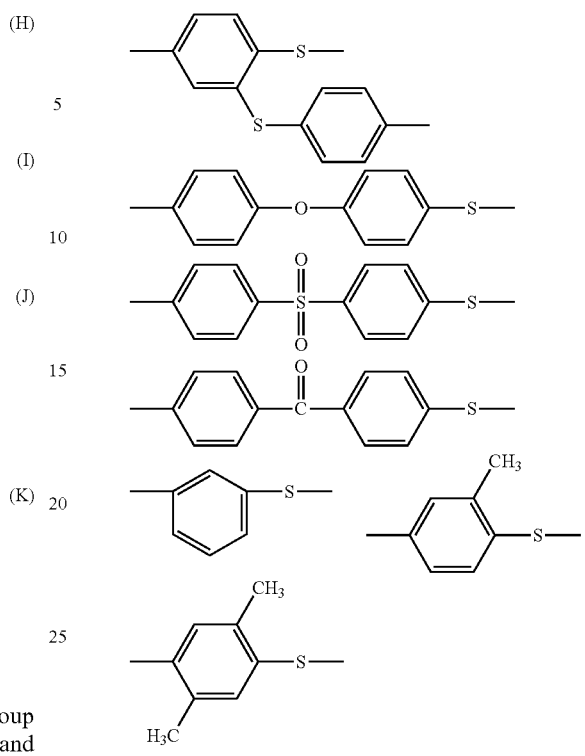

wherein R1 and R2 each represent a substituent group selected from hydrogen, an alkyl group, an alkoxy group and a halogen group, and R1 and R2 may be the same or different.

The repeating unit of the polyarylene sulfide used in the present invention is preferably a structural formula represented by the above formula (A), and typical examples include polyphenylene sulfide, polyphenylene sulfide sulfone, polyphenylene sulfide ketone, random copolymers and block copolymers thereof and mixtures thereof. From the standpoint of film physical properties and from an economical viewpoint, the polyarylene sulfide is particularly preferably polyphenylene sulfide (PPS) that is a resin containing, as a major constituent unit of the polymer, preferably at least 80 mol %, more preferably at least 90 mol %, p-phenylene sulfide unit represented by the structural formula below. When such p-phenylene sulfide component is less than 80 mol %, the crystallinity and heat transfer temperature of the polymer are low, and properties of PPS, that is, heat resistance, dimensional stability, mechanical characteristics and dielectric characteristics may be deteriorated.

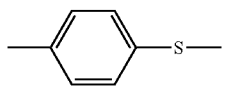

In the above-mentioned PPS resin, other copolymerizable sulfide linkage-containing units may be contained in an amount of less than 20 mol %, preferably less than 10 mol %, based on the total repeating units. Repeating units contained in an amount of less than 20 mol %, preferably less than 10 mol %, based on the total repeating units include, for example, a trifunctional unit, an ether unit, a sulfone unit, a ketone unit, a meta-linkage unit, an aryl unit having a substituent group such as an alkyl group, a biphenyl unit, a terphenylene unit, a vinylene unit and a carbonate unit, and specific examples include the following structural units. Among these units, one or more units can be coexistent to constitute the resin. In this case, the structural units may be copolymerized to form a random or block copolymer.

Insofar as the PPS resin and PPS resin composition can be melted and kneaded, the melt viscosity thereof is not particularly limited, and is preferably in the range of 100 to 2,000 Pa·s, more preferably 200 to 1,000 Pa·s, at a shear rate of 1,000 (l/sec) at a temperature of 315° C.

PPS mentioned in the present invention can be produced by various methods, for example, by a method of obtaining a polymer having a relatively small molecular weight as described in Japanese Examined Patent Publication No. 1970-3368 or a method of obtaining a polymer having a relatively large molecular weight as described in Japanese Examined Patent Publication No. 1977-12240 or Japanese Unexamined Patent Publication 1986-7332.

In the present invention, the resulting PPS resin can also be used after various treatments such as crosslinkage/polymerization by heating in air, heat treatment under an inert gas atmosphere such as nitrogen or under reduced pressure, washing with an organic solvent, hot water and an aqueous acid solution, and activation with a functional group-containing compound such as an acid anhydride, amine, isocyanate and functional disulfide compound.

Now, the method of producing PPS resin is illustrated, but is not particularly limited in the present invention. For example, sodium sulfide and p-dichlorobenzene are reacted at high temperature at high pressure in an amide-based polar solvent such as N-methyl-2-pyrrolidone (NMP). If necessary, a copolymerization component such as trihalobenzene can be contained therein. As an agent for regulating the degree of polymerization, potassium hydroxide or an alkali metal carboxylate can be added for polymerization reaction at 230 to 280° C. After polymerization, the polymer is cooled and filtered as water slurry through a filter to give a granular polymer. This product is stirred in an aqueous solution such as acetate at 30 to 100° C. for 10 to 60 minutes, then washed several times with deionized water at 30 to 80° C. and dried to give PPS powder. This powdery polymer is washed with NMP at an oxygen partial pressure of 10 Torr or less, preferably 5 Torr or less, then washed several times with deionized water at 30 to 80° C. and dried under reduced pressure at 5 Torr or less. The polymer thus obtained is a substantially linear PPS polymer and can thus be stably stretched to produce a film. As a matter of course, other polymer compounds and organic or inorganic compounds such as silicon oxides, magnesium oxide, calcium carbonate, titanium oxide, aluminum oxide, crosslinked polyester, crosslinked polystyrene, mica, talc and kaolin, pyrolysis inhibitors, heat stabilizers and antioxidants may be added if necessary.

The method of crosslinkage/polymerization of PPS resin by heating can be exemplified specifically by a method which involves heating until desired melt viscosity is obtained at a predetermined temperature in a heated container, in an oxidizing gas atmosphere such as air or oxygen or in a mixed-gas atmosphere consisting of the oxidizing gas and an inert gas such as nitrogen and argon. The heat treatment temperature is usually selected in the range of 170 to 280° C., more preferably 200 to 270° C., and the heat treatment time is usually selected in the range of 0.5 to 100 hours, more preferably 2 to 50 hours, and both the heat treatment temperature and time can be regulated to attain the intended viscosity level. The device for heat treatment may be a usual hot air drying machine or a rotary heating device or a heating device equipped with a stirring blade, and for efficient and uniform treatment, a rotary heating device or a heating device equipped with a stirring blade is preferably used.

The method of heat treatment of PPS resin in an inert gas atmosphere such as nitrogen or under reduced pressure can be exemplified specifically by a method of heat treatment at a heat treatment temperature of 150 to 280° C., preferably 200 to 270° C., for a heating time of 0.5 to 100 hours, preferably 2 to 50 hours, in an inert gas atmosphere such as nitrogen or under reduced pressure. The device for heat treatment may be a usual hot air drying machine or a rotary heating device or a heating device equipped with a stirring blade, and for efficient and uniform treatment, a rotary heating device or a heating device equipped with a stirring blade is preferably used. The PPS resin used in the present invention is preferably substantially linear PPS which is not subjected to polymerization by thermal oxidation crosslinking treatment in order to achieve the aim of improvement of tensile elongation at break.

The PPS resin used in the present invention is preferably PPS resin subjected to deionization treatment. The method of deionization treatment can be exemplified specifically by washing treatment with an aqueous acid solution, washing treatment with hot water and washing treatment with an organic solvent, and these treatments may be a combination of two or more methods.

The method of washing treatment of PPS resin with an organic solvent can be exemplified by the following method. That is, the organic solvent is not particularly limited insofar as it does not have an action of decomposing PPS resin, and examples include nitrogen-containing polar solvents such as N-methyl pyrrolidone, dimethyl formamide, dimethyl acetamide etc., sulfoxide sulfone solvents such as dimethyl sulfoxide, dimethyl sulfone etc., ketone solvents such as acetone, methyl ethyl ketone, diethyl ketone, acetophenone etc., ether solvents such as dimethyl ether, dipropyl ether, tetrahydrofuran etc., halogen-based solvents such as chloroform, methylene chloride, trichloroethylene, ethylene dichloride, dichloroethane, tetrachloroethane, chlorobenzene etc., alcohol phenol solvents such as methanol, ethanol, propanol, butanol, pentanol, ethylene glycol, propylene glycol, phenol, cresol, polyethylene glycol etc., and aromatic hydrocarbon solvents such as benzene, toluene and xylene. Among these organic solvents, N-methylpyrrolidone, acetone, dimethyl formamide and chloroform can be particularly preferably used. These organic solvents can be used alone or as a mixture of two or more thereof.

The method of washing with an organic solvent includes a method of dipping PPS resin in an organic solvent, wherein the resin can be suitably stirred or heated if necessary. When PPS resin is washed with an organic solvent, the washing temperature is not particularly limited and can be selected arbitrarily in the range of ordinary temperature to 300° C. As the washing temperature is increased, the efficiency of washing tends to increase, and usually a sufficient effect can be obtained at ordinary temperature to a temperature of 150° C. The PPS resin washed with an organic solvent is preferably washed several times with water or heated water to remove the residual organic solvent.

The specific method of washing PPS resin with heated water can be exemplified by the following method. That is, the water used is preferably distilled water or deionized water to exhibit the effect of preferable chemical modification of PPS resin by washing with heated water. The operation of treatment with heated water is carried out usually by introducing a predetermined amount of PPS resin into a predetermined amount of water and heating it under stirring at ordinary pressures or in a pressurized container. The ratio of PPS resin to water is established preferably such that water is greater than PPS resin, and usually a bath ratio of 200 g or less of PPS resin to 1 L of water is selected.

The specific method of washing PPS resin with an aqueous acid solution can be exemplified by the following method. That is, there is a method of dipping PPS resin in an acid or in an aqueous acid solution, if necessary under suitable stirring or heating. The used acid is not particularly limited insofar as it does not have an action of decomposing PPS resin, and examples of such acid include aliphatic saturated monocarboxylic acids such as formic acid, acetic acid, propionic acid and butyric acid, halogen-substituted aliphatic saturated carboxylic acids such as chloroacetic acid, dichloroacetic acid etc., aliphatic unsaturated monocarboxylic acids such as acrylic acid, crotonic acid etc., aromatic carboxylic acids such as benzoic acid, salicylic acid etc., dicarboxylic acids such as oxalic acid, malonic acid, succinic acid, phthalic acid, fumaric acid etc., and inorganic acid compounds such as sulfuric acid, phosphoric acid, hydrochloric acid, carbonic acid and silicic acid. Among these compounds, acetic acid and hydrochloric acid are preferably used. Acid-treated PPS resin is preferably washed several times with water or heated water to remove a residual acid, salt etc. The water used in washing is preferably distilled water or deionized water in the sense that the effect of preferable chemical modification of PPS resin is not deteriorated by acid treatment. By washing with an aqueous acid solution, the acid terminal component of PPS resin is preferably increased to increase dispersibility and mixing performance with other thermoplastic resin A thereby easily attaining an effect of reducing the average particle diameter of the dispersed phase.

As the other thermoplastic resin A different from the polyarylene sulfide contained in the biaxially oriented polyarylene sulfide film of the present invention, it is possible to employ, for example, various polymers such as polyamide, polyether imide, polyether sulfone, polysulfone, polyphenylene ether, polyester, polyarylate, polyamideimide, polycarbonate, polyolefin and polyether ether ketone, and blends containing at least one of these polymers. From the viewpoint of mixing with the polyarylene sulfide and exhibiting the effect of the present invention, the thermoplastic resin A in the present invention is preferably at least one member selected from polyamide, polyether imide, polyether sulfone and polysulfone. Particularly, the polyamide itself can be preferably used because it is a polymer having excellent ductility.

As the thermoplastic resin A contained in the biaxially oriented polyarylene sulfide of the present invention, a polyamide is preferably used. The polyamide is not particularly limited insofar as it is a known polyamide, and the polyamide is usually a polyamide based on main constituents such as amino acid, lactam or diamine and dicarboxylic acid. Typical examples of its main constituents include amino acids such as 6-aminocaproic acid, 11-aminoundecanoic acid, 12-aminododecanoic acid, para-aminomethylbenzoic acid etc., lactams such as ∈-aminocaprolactam, ω-laurolactam etc., aliphatic, alicyclic and aromatic diamines such as tetramethylenediamine, hexamethylenediamine, undecamethylene diamine, dodecamethylene diamine, 2,2,4-/2,4,4-trimethylhexamethylene diamine, 5-methylnonamethylene diamine, meta-xylene diamine, para-xylylene diamine, 1,3-bis(aminomethyl)cyclohexane, 1,4-bis(aminomethyl)cyclohexane, 1-amino-3-aminomethyl-3,5,5-trimethyl cyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethyl piperazine, 2-methylpentamethylene diamine etc., aliphatic, alicyclic and aromatic dicarboxylic acids such as adipic acid, suberic acid, azelaic acid, sebacic acid, dodecane diacid, terephthalic acid, isophthalic acid, 2-chloroterephthalic acid, 2-methylterephthalic acid, 5-methylisophthalic acid, 5-sodium sulfoisophthalic acid, hexahydroterephthalic acid, hexahydroisophthalic acid etc., and in the present invention, polyamide homopolymers or copolymers derived from these materials can be used alone or as a mixture thereof.

The polyamide useful in the present invention includes homopolyamide resins such as polycaproamide (nylon 6), polyhexamethylene adipamide (nylon 66), polytetramethylene adipamide (nylon 46), polyhexamethylenecebacamide (nylon 610), polyhexamethylene dodecamide (nylon 612), polydodecane amide (nylon 12), polyundecane amide (nylon 11), polyhexamethylene terephthalamide (nylon 6T), polyxylylene adipamide (nylon XD6) etc. or copolymers thereof, that is, copolymer polyamide (nylon 6/66, nylon 6/10, nylon 6/66/610, 66/6T) etc. These polyamide resins can also be used as a mixture thereof ("/" indicates copolymerization; this hereinafter applies).

As the homopolyamide resin described above, nylon 6, nylon 610 or nylon 46 is more preferably used. Particularly, nylon 610 can be preferably used because it has high heat resistance in co-extrusion with polyarylene sulfide and has an effect of improving tensile elongation to exhibit ductility at high level. As the copolymer polyamide, a copolymer comprising nylon 6 copolymerized with another polyamide component can be used more preferably for improving tensile elongation to exhibit ductility, and particularly nylon 6/66 copolymer has a significant effect of improving tensile elongation to exhibit ductility, so the nylon 6/66 copolymer containing nylon 6 copolymer in a higher amount than nylon 66 can be particularly preferably used.

Other examples of the other thermoplastic resin A contained in the biaxially oriented polyarylene sulfide film of the present invention include polyether imide. The polyether imide is not particularly limited, and preferable examples can include a polymer that is a structural unit containing an ether linkage in a polyimide constituent, as shown in the following general formula:

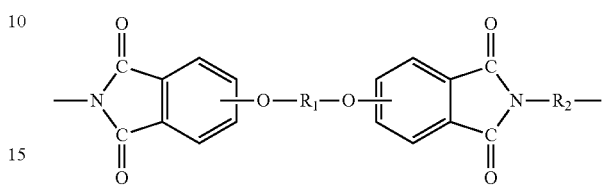

wherein R1 is a divalent organic group selected from the group consisting of divalent aromatic, aliphatic and alicyclic groups each having 2 to 30 carbon atoms, and R2 is the divalent organic group similar to that of the above-mentioned R.

The above-mentioned R1 and R2 can include, for example, the following aromatic groups:

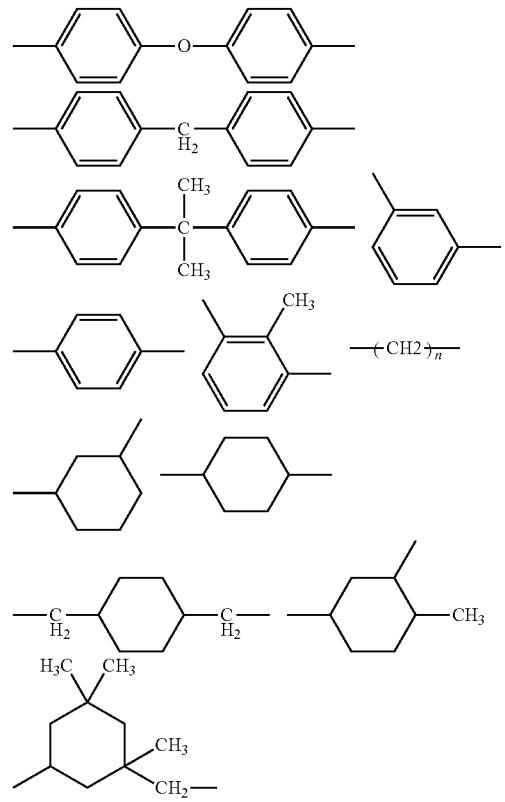

When polyether imide having a glass transition temperature of 350° C. or less, more preferably 250° C. or less, is used in the present invention, the effect of the present invention can be easily attained, and from the viewpoint of compatibility with polyarylene sulfide, melt-moldability etc., a condensate of 2,2-bis[4-(2,3-dicarboxyphenoxy)phenyl]propane dianhydride and m-phenylene diamine or p-phenylene diamine, having a structural unit shown in the following formula, is preferable:

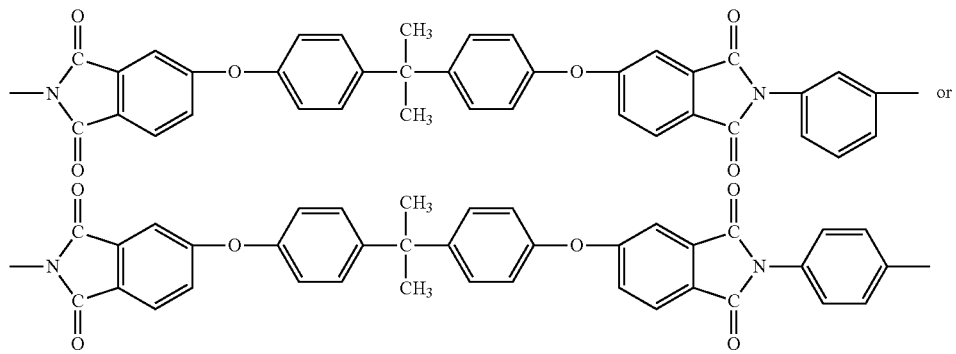

The polyether imide having this structural unit is available under the registered trademark "Ultem" from GE Plastics. For example, the polyether imide having the structural unit (the former formula) containing a unit derived from m-phenylene diamine includes "Ultem 1000" and "Ultem 1010". The polyether imide having the structural unit (the latter formula) containing a unit derived from m-phenylene diamine includes "Ultem CRS5000".

Other examples of the other thermoplastic resin A contained in the biaxially oriented polyarylene sulfide film of the present invention include polysulfone and polyether sulfone containing, in the molecular skeleton thereof, the same sulfur atom as in the polyarylene sulfide. The polysulfone and polyether sulfone used can be the various sulfones known in the art. From the viewpoint of mixing with polyarylene sulfide, the terminal group of the polyether sulfone includes a chlorine atom, an alkoxy group and a phenolic hydroxyl group. The thermoplastic resin A can also be exemplified by polyphenylene ether having a similar molecular structure to that of the polyarylene sulfide.

For further improving tensile elongation to exhibit more excellent ductility in the present invention, a compound having one or more groups selected from an epoxy group, an amino group and an isocyanate group is added as a compatibilizing agent in an amount of 0.1 to 10 parts by weight based on 100 parts by weight of the polyarylene sulfide and thermoplastic resin A in total.

Specific examples of such compatibilizing agent include bisphenol glycidyl ethers such as bisphenol A, resorcinol, hydroquinone, pyrocatechol, bisphenol F, saligenin, 1,3,5-trihydroxybenzene, bisphenol S, trihydroxy-diphenyl dimethyl methane, 4,4'-dihydroxybiphenyl, 1,5-dihydroxynaphthalene, cashew phenol, 2.2.5.5-tetrakis(4-hydroxyphenyl)hexane etc., the same compounds as above except that halogenated bisphenol was used in place of bisphenol, glycidyl ether epoxy compounds such as butane diol diglycidyl ether, glycidyl ester compounds such as phthalic glycidyl ester, glycidyl epoxy resin such as glycidyl amine compounds of N-glycidyl aniline etc., linear epoxy compounds such as epoxidized polyolefin, epoxidized soybean oil etc., and cyclic, non-glycidyl epoxy resin such as vinylcyclohexene dioxide, dicyclopentadiene dioxide etc. Other novolac-type epoxy resin can also be mentioned. The novolac-type epoxy resin has 2 or more epoxy groups and is obtained usually by reacting epichlorohydrin with novolac-type phenol resin. The novolac-type phenol resin is obtained by condensation reaction of phenols with formaldehyde. The starting phenols are not particularly limited, and examples thereof include phenol, o-cresol, m-cresol, p-cresol, bisphenol A, resorcinol, p-tertiary butyl phenol, bisphenol F, bisphenol S and condensates thereof.

Other olefin copolymers having an epoxy group can also be mentioned. The olefin copolymers having an epoxy group (epoxy group-containing olefin copolymers) include olefin copolymers obtained by introducing a monomer component having an epoxy group into an olefin (co)polymer. A copolymer comprising an olefin polymer having a double bond in its main chain wherein the double bond moiety was epoxidized can also be used.

Examples of functional group-containing components for introducing a monomer component having an epoxy group into an olefin (co)polymer include monomers having an epoxy group, such as glycidyl acrylate, glycidyl methacrylate, glycidyl ethacrylate, glycidyl itaconate and glycidyl citraconate.

The method of introducing the epoxy group-containing component is not particularly limited, and a method of copolymerizing it with α-olefin or a method of grafting it onto an olefin (co)polymer with a radical initiator can be used.

The amount of the epoxy group-containing monomer component introduced is suitably in the range of 0.001 to 40 mol %, preferably 0.01 to 35 mol %, based on the whole of the monomer serving as the starting material of the epoxy group-containing olefin copolymer.

The epoxy group-containing olefin copolymer which is particularly useful in the invention is preferably an olefin copolymer having an α-olefin and an α,β-unsaturated carboxylic glycidyl ester as copolymer components. The α-olefin is preferably ethylene. The copolymer may be further copolymerized with α,β-unsaturated carboxylic acids and alkyl esters thereof, such as acrylic acid, methyl acrylate, ethyl acrylate, butyl acrylate, methacrylic acid, methyl methacrylate, ethyl methacrylate, butyl methacrylate etc., styrene, acrylonitrile etc.

Such olefin copolymers may be in any modes of random, alternating, block and graft copolymers.

The olefin copolymer having an α-olefin and an α,β-unsaturated carboxylic glycidyl ester copolymerized therein is particularly preferably an olefin copolymer having 60 to 99 wt % α-olefin and 1 to 40 wt % α,β-unsaturated carboxylic glycidyl ester copolymerized therein.

Specific examples of the α,β-unsaturated carboxylic glycidyl ester include glycidyl acrylate, glycidylmethacrylate and glycidyl ethacrylate, among which glycidyl methacrylate is preferably used.

Specific examples of the olefin copolymer having an α-olefin and an α,β-unsaturated carboxylic glycidyl ester essentially copolymerized therein include an ethylene/propylene-g-glycidyl methacrylate copolymer ("g" indicates graft; this hereinafter applies), an ethylene/butene-1-g-glycidyl methacrylate copolymer, an ethylene-glycidyl methacrylate copolymer-g-polystyrene, an ethylene-glycidyl methacrylate copolymer-g-acrylonitrile-styrene copolymer, an ethylene-glycidyl methacrylate copolymer-g-PMMA, an ethylene/glycidyl acrylate copolymer, an ethylene/glycidyl methacrylate copolymer, an ethylene/methyl acrylate/glycidyl methacrylate copolymer, and an ethylene/methyl methacrylate/glycidyl methacrylate copolymer.

Specific examples of the compatibilizing agent include alkoxysilane having one or more functional groups selected from an epoxy group, an amino group and an isocyanate group. Specific examples of such compounds include epoxy group-containing alkoxysilane compounds such as γ-glycidoxypropyltrimethoxy silane, γ-glycidoxypropyltriethoxy silane, β-(3,4-epoxycyclohexyl)ethyltrimethoxy silane etc., ureido group-containing alkoxysilane compounds such as γ-ureidopropyltriethoxy silane, γ-ureidopropyltrimethoxy silane, γ-(2-ureidoethyl)aminopropyltrimethoxy silane etc., isocyanato group-containing alkoxysilane compounds such as γ-isocyanatopropyltriethoxy silane, γ-isocyanatopropyltrimethoxy silane, γ-isocyanatopropylmethyldimethoxy silane, γ-isocyanatopropylmethyldiethoxy silane, γ-isocyanatopropylethyldimethoxy silane, γ-isocyanatopropylethyldiethoxy silane, γ-isocyanatopropyl trichlorosilane etc., and amino group-containing alkoxysilane compounds such as γ-(2-aminoethyl)aminopropylmethyldimethoxy silane, γ-(2-aminoethyl)aminopropyltrimethoxy silane, γ-aminopropyltrimethoxy silane etc.

The alkoxysilane having one or more functional groups selected from an epoxy group, an amino group and an isocyanate group can be mentioned as the most preferable example of the compatibilizing agent in the present invention and can be used to easily reduce a coarse dispersion attributable to insufficient dispersion of the dispersed phase of the biaxially oriented polyarylene sulfide film containing the thermoplastic resin A and easily regulate the average particle diameter in the preferable range of the present invention thereby easily attaining the effect of the present invention.

The tensile elongation at break of the biaxially oriented polyarylene sulfide film of the present invention in both of the longitudinal direction (MD) and width direction (TD) is 80 to 250(%), and the tensile elongation at break thereof in least one of the longitudinal direction and width direction is 110 to 250%. The tensile elongation at break thereof in both of the longitudinal direction and width direction is preferably 110 to 230(%), most preferably 120 to 200(%). For attaining the preferable range of tensile elongation at break, the content of the thermoplastic resin A and the average particle diameter of the dispersed phase are preferably controlled in the preferable range of the present invention. When the tensile elongation at break of the film in both the longitudinal direction and width direction is less than 80(%), the film is poor in ductility for processing for use as a motor slot liner or wedge and is thus broken or practically not usable in some cases. For obtaining a film having a tensile elongation at break of greater than 250(%) in both the longitudinal direction and width direction of the film, the draw ratio should be decreased in the drawing process, but the planarity of the film may be deteriorated or the mechanical strength may be decreased to lower the stiffness of the film.

The tensile elongation at break is determined with an Instron-type tensile testing machine by cutting a sample out in the tensile direction as measurement direction, putting the sample between upper and lower mounted parts, and measuring the elongation of the sample at breakage in a tensile test as the tensile elongation at break. That is, a sample film width 10 mm×chuck distance 100 mm was measured with an Instron-type tensile testing machine at a stress rate of 100 mm/min. in an atmosphere at a temperature of 23° C. and 65% relative humidity according to a method prescribed in ASTM D-882. The number of samples was 10, and the samples were measured respectively to determine the average tensile at break elongation.

The tensile strength at break of the biaxially oriented polyarylene sulfide film of the present invention in the longitudinal direction (MD) and width direction (TD) is preferably 100 to 400 (MPa), more preferably 150 to 350 (MPa), still more preferably 180 to 320 (MPa). For attaining the preferable range of tensile strength at break, the average particle diameter of the dispersed phase of the thermoplastic resin A is preferably controlled in the preferable range of the present invention. When the rupture strength at break in both the longitudinal and width directions is less than 100 (MPa), for example, the film is poor in mechanical strength and is thus broken during processing or at use or is practically not usable in some cases. For obtaining a film having a tensile strength at break of greater than 400 (MPa) in both the longitudinal and width directions of the film, the draw ratio should be increased in the drawing process, but the film may be broken upon stretching or may be poor in tensile elongation.

The primary dispersion peak temperature at loss tangent of dynamic viscoelasticity of the biaxially oriented polyarylene sulfide film of the present invention at a frequency of 1 Hz is preferably 100 to 135° C. Such film can be easily endowed with improved features such as improved tensile elongation at break and molding processability. The primary dispersion peak temperature is more preferably in the range of 105 to 130° C., further more preferably in the range of 110 to 125° C. When the primary dispersion peak temperature at loss tangent of dynamic viscoelasticity is less than 100° C., the molecular-chain orientation of polyarylene sulfide is insufficient so that the tensile elongation at break is too low and the ductility is insufficient, and the film is broken during processing or at use or is practically not usable in some cases. On the other hand, when the primary dispersion peak temperature is higher than 135° C., the molecular-chain orientation is progressed extremely and the tensile elongation at break is too low, so the film is broken during processing or at use or is practically not usable in some cases, and heat shrinkage may become high. The primary dispersion peak temperature at loss tangent of dynamic viscoelasticity of the polyarylene sulfide film can be controlled for example by allowing the draw temperature and draw ratio in longitudinal drawing and the draw temperature and draw ratio in lateral drawing to be in the preferable range of the present invention. As used herein, the primary dispersion peak temperature at loss tangent of dynamic viscoelasticity refers to the temperature of a dispersion peak having the largest value in temperature dispersion at loss tangent.

For the primary dispersion peak temperature of dynamic viscoelasticity, a sample having a width of 10 mm and a length (chuck distance) of 20 mm (provided that the longitudinal direction of the film is the sample length) is heated at a temperature of 30° C. to 200° C. at a temperature increasing rate of 2° C./min. and measured at a vibrational frequency of 1 Hz. A graph wherein loss tangent (tan δ) obtained from data is plotted against temperature (30 to 200° C.) on the abscissa is prepared, and the temperature at which tan δ becomes the highest is read as the primary dispersion peak temperature of dynamic viscoelasticity.

The crystal melting heat quantity of polyarylene sulfide in the biaxially oriented polyarylene sulfide film of the present invention is preferably 20 to 45 (J/g). The crystal melting heat quantity is more preferably in the range of 23 to 40 (J/g) more preferably in the range of 25 to 37 (J/g). The crystal melting heat quantity of polyarylene sulfide reflects the amount of polyarylene sulfide crystals. When the melting heat quantity is higher than 45 (J/g), the film is easily made brittle, and for example, the film is broken during processing or at use or is practically not usable in some cases. When the melting heat quantity is less than 20 (J/g), heat shrinkage may be increased and heat resistance may be insufficient. For example, when the preliminary heating temperature before lateral stretching, the stretching temperature in lateral stretching and the heat fixation temperature after stretching are in the preferable range of the present invention, the crystal melting heat quantity of the polyarylene sulfide film can be in the range of the present invention. The crystal melting heat quantity refers to the heat quantity in an endothermic peak of melting point measured with a differential scanning calorimeter (DSC).

Although the time when the polyarylene sulfide is mixed with the other thermoplastic resin A is not particularly limited in the present invention, there is a method wherein before melt-extrusion, a mixture of polyarylene sulfide and other thermoplastic resin A is preliminarily melt-kneaded (pelletized) into master chips and a method wherein the materials are mixed at the time of melt-extrusion and melt-kneaded. The method is particularly preferably a method wherein the materials are preliminarily kneaded into master chips with a high-shear mixer such as a twin-screw extruder capable of applying shear stress. In this case, a master chip material consisting of the mixture may be introduced into a usual single-screw extruder and then melted to form a film or subjected directly to sheeting under high shearing without forming master chips. For mixing in a twin-screw extruder, a 3- or 2-thread twin-screw extruder is equipped preferably with a kneading zone in the temperature range of preferably the polyarylene sulfide resin melting point +5 to 55° C. for reducing insufficient dispersing. The temperature range is more preferably the polyarylene sulfide resin melting point +10 to 45° C., still more preferably the polyarylene sulfide resin melting point +10 to 35° C.

By regulating the temperature in the kneading zone in the preferable range, the shear stress can be increased, insufficient dispersing can be reduced, and the particle diameter of the dispersed phase can be controlled in the preferable range of the present invention. At that time, the retention time is preferably in the range of 1 to 5 minutes. The number of revolutions of the screw is preferably in the range of 100 to 500 rpm, more preferably 200 to 400 rpm. By setting the number of revolutions of the screw in the preferable range, high shear stress can be easily applied, and the particle diameter of the dispersed phase can be controlled in the preferable range of the present invention. The ratio (screw length/screw diameter ratio) of the twin-screw extruder is preferably in the range of 20 to 60, more preferably in the range of 30 to 50.

The twin-screw extruder is provided with kneading zones with a kneading paddle for increasing kneading force wherein the number of the kneading zones is 2 or more, still more preferably 3 or more. In this case, the order of mixing the materials is not particularly limited, and it is possible to use a method wherein all the materials are compounded and then melt-kneaded by the above method, a method wherein a part of the materials is compounded, then melt-kneaded by the above method, compounded with the rest of the materials and melt-kneaded, or a method wherein a part of the materials is compounded and then melt-kneaded by a single- or twin-screw extruder and simultaneously mixed with the rest of the materials sent via a side feeder. A method of utilizing a supercritical fluid, as described in "Seikei Kakou (Molding Processing)", Journal of Japan Society of Polymer Processing (JSPP), Vol. 15, No. 6, pp. 382-385 (2003), can also be preferably used.

The biaxially oriented polyarylene sulfide film of the present invention may contain other components such as a heat stabilizer, an antioxidant, an ultraviolet absorber, an antistatic agent, a flame retardant, pigment, dye, and an organic lubricant such as fatty ester and wax insofar as the advantages of the present invention are not reduced. In order to impart slipability, wear resistance, and/or scratch resistance to surface of the film, the biaxially oriented polyarylene sulfide film may contain inorganic or organic particles. Such additives may contain inorganic particles such as those of clay, mica, titanium oxide, calcium carbonate, kaolin, talc, wet- or dry-process silica, colloidal silica, calcium phosphate, barium sulfate, alumina and zirconia, organic particles composed of acrylates, styrene etc., internal particles to be precipitated by a catalyst etc. added at the time of polymerization reaction of polyarylene sulfide, and a surfactant.

The thickness of the biaxially oriented polyarylene sulfide film of the present invention varies depending on applications etc., and is preferably 500 μm or less, and from the viewpoint of application to thin film and workability, is more preferably in the range of 10 to 300 μm, still more preferably in the range of 20 to 200 μm.

The biaxially oriented polyarylene sulfide film of the present invention may further be laminated, directly or via a layer such as an adhesive layer, with a layer consisting of polyarylene sulfide or another polymer, for example a layer consisting of polyester, polyolefin, polyamide, polyimide, polyvinylidene chloride or an acrylic polymer.

The biaxially oriented polyarylene sulfide film of the present invention may be subjected if necessary to arbitrary processing such as heat treatment, molding, surface treatment, lamination, coating, printing, embossing or etching.

Although applications of the biaxially oriented polyarylene sulfide film of the present invention are not particularly limited, the biaxially oriented polyarylene sulfide film can be used in various industrial materials, for example an electrical insulating material for a motor, a transformer, an insulated cable etc., molding material, a circuit board material, a step/release film for circuit/optical element etc., a protective film, a lithium ion battery material, a fuel battery material, a speaker diaphragm, etc. More specifically, it can be preferably used in an electrical insulating material for a hot-water supplier motor, a motor for car air conditioner and a driving motor used in a hybrid car, and a speaker diaphragm for cell-phone.

The laminated polyarylene sulfide sheet of the present invention comprises the biaxially oriented polyarylene sulfide layer (layer a) arranged in at least one of the outermost layers. As the biaxially oriented polyarylene sulfide layer, a biaxially oriented polyarylene sulfide film is used which comprises polyarylene sulfide and other thermoplastic resin A different from the polyarylene sulfide, wherein the contents of the polyarylene sulfide and the thermoplastic resin A are 70 to 99 parts by weight and 1 to 30 parts by weight respectively when the total amount of the polyarylene sulfide and the thermoplastic resin A is taken as 100 parts by weight and the resin thermoplastic A forms a dispersed phase with an average particle diameter of 10 to 500 nm.

The layer a contains polyarylene sulfide and other thermoplastic resin A, wherein the contents of the polyarylene sulfide and the thermoplastic resin A are preferably 70 to 95 parts by weight and 5 to 30 parts by weight respectively when the total amount of both is taken as 100 parts by weight. The contents of the polyarylene sulfide and the thermoplastic resin A are more preferably 80 to 95 parts by weight and 5 to 20 parts by weight respectively, and still more preferably, the contents of the polyarylene sulfide and the thermoplastic resin A are 80 to 93 parts by weight and 7 to 20 parts by weight respectively. The average particle diameter of the dispersed phase of the thermoplastic resin A is preferably in the range of 20 to 300 nm, more preferably 30 to 200 nm, most preferably 30 to 120 nm.

It is important that the laminated polyarylene sulfide sheet has a non-oriented polyarylene sulfide layer (layer b) as an intermediate layer in order to improve the impact resistance of the laminated polyarylene sulfide sheet. The number of laminated layers is preferably 2 to 10, more preferably 3 to 5. Particularly, a 3-layer sheet is the most preferable.

In the laminated polyarylene sulfide sheet of the present invention, at least one of the outermost layers is a biaxially oriented polyarylene sulfide layer (layer a), or each of the outermost layers in the front-back both sides may be a biaxially oriented polyarylene sulfide layer. From the viewpoint of tear resistance, the laminated polyarylene sulfide sheet preferably has a non-oriented polyarylene sulfide layer (layer b) as a layer (intermediate layer) other than the outermost layers. In the present invention, it is important that the laminated polyarylene sulfide sheet has the biaxially oriented polyarylene sulfide layer in the outermost layer so that the tensile elongation at break of the sheet can be in the range of the present invention.

The non-oriented polyarylene sulfide layer (layer b) used preferably in the present invention refers generally to a substantially non-oriented film, sheet or plate formed by melt-molding. In biaxial orientation, molecular chains in film plane in the longitudinal direction and width direction of the film are more oriented than in the thickness direction of the film, while in non-orientation, molecular-chain orientation is almost isotropic in film plane such as in the longitudinal and width directions of the film and in the thickness direction. The thickness of the layer b is preferably 1 mm or less. Particularly, the laminated polyarylene sulfide sheet can be exemplified preferably by a laminated sheet having a 3-layer structure (a/b/a) consisting of biaxially oriented polyarylene sulfide films (layers a) as the outermost layers and a non-oriented polyarylene sulfide layer (layer b) as an intermediate layer.

Although the method of laminating the laminated polyarylene sulfide sheet of the present invention is not particularly limited, a heat lamination method of fixation by heat melting without an adhesive can be used preferably for improving interlayer adhesion.

In the laminated polyarylene sulfide sheet of the present invention, the non-oriented polyarylene sulfide layer may be subjected to heat treatment or oxidation crosslinking treatment before lamination. The surfaces of the non-oriented polyarylene sulfide layer (layer b) and the biaxially oriented polyarylene sulfide layer (layer a) are preferably subjected to corona discharge treatment or plasma treatment.

In the laminated polyarylene sulfide sheet comprising the non-oriented polyarylene sulfide layer (layer b) and the biaxially oriented polyarylene sulfide layer (layer a), the orientation of each layer can be determined for example by preparing a section of the laminated sheet by ultramicrotomy and then measuring the sheet section by techniques such as laser raman spectroscopy and infrared spectroscopy. When the thickness of each layer is not sufficient, a sample section can be prepared by crosswise cutting etc. For example, when the orientation of the polyphenylene sulfide is measured by laser raman spectroscopy, the ratio of raman intensity ($I_{740}$) at 740 cm$^{-1}$ to raman intensity at 1570 cm$^{-1}$ ($I_{1570}$) that is, $I_{1570}/I_{740}$, can be an indicator of molecular-chain orientation, and by polarized light parallel to each of the longitudinal direction, width direction and thickness direction of the film, the orientation of molecular chains in each direction can be obtained as an indicator. When the indicator is almost equal regardless of the longitudinal direction, the width direction and the thickness direction, it can be judged that the film is non-oriented. On the other hand, when the indicator in the longitudinal and width directions is greater than the indicator in the thickness direction, it can be judged that the film is biaxially oriented. The method of producing the non-oriented polyphenylene sulfide film involves drying the PPS resin composition and copolymerized PPS sufficiently and then feeding them to different extruders or mixing copolymerized PPS in an amount of 10 to 100 wt % with the PPS resin composition and then feeding the mixture to a melting extruder heated to a temperature not lower than the melting point of the resin composition in a nitrogen stream or under reduced pressure so as not to reduce the inherent viscosity, then extruding it through a die, and cooled and solidified by intimate contact, by a contacting means such as electrostatic charging or by an air chamber method, an air knife method or a press rolling method, with a cast drum having a surface temperature not higher than the glass transition point of the resin composition, whereby the non-oriented polyphenylene sulfide film is prepared. A filter made of sintered metal, porous ceramic, sand or gauze is preferably used to remove contaminants, foreign matters and/or deteriorated polymer matters in the melting extruder.

In the present invention, the copolymerized polyphenylene sulfide layer (layer c) is preferably contained between the biaxially oriented polyarylene sulfide film layers (layers a) as the outermost layers in order that the tensile elongation at break of the laminated sheet of the present invention is in the preferable range of the present invention. Particularly, the laminated polyarylene sulfide sheet can be exemplified preferably by a laminated sheet having a 3-layer structure (a/c/a) consisting of biaxially oriented polyarylene sulfide films (layers a) as the outermost layers and the copolymerized polyphenylene sulfide layer (layer c) as an intermediate layer.

The copolymerized polyphenylene sulfide used in the present invention is composed of p-phenylene sulfide units in an amount of 50 to less than 95 mol %, preferably 70 to less than 92 mol %, still more preferably 80 to less than 92 mol %, based on the total repeating units. When such component is less than 50 mol %, the heat resistance of the film may be significantly lowered, while in an amount of 95% or more, interlayer adhesion cannot be sufficiently increased, so the laminated sheet cannot be highly elongated.

The copolymerized unit includes the following m-phenylene sulfide units:

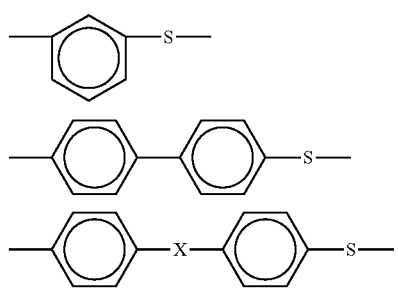

wherein X represents an alkylene, CO or SO$_2$ unit.

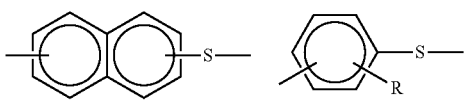

wherein R represents an alkyl, nitro, phenylene or alkoxy group, and a combination of these units may be present. The copolymer unit is preferably m-phenylene sulfide unit. The amount of these units copolymerized is preferably 3 to 50 mol %, more preferably 5 to 30 mol %, still more preferably 8 to 20 mol %. When the amount of such copolymerized component is less than 3 mol %, interlayer adhesion cannot be sufficiently increased, so the laminated sheet may not be highly elongated, and as a result, the tensile elongation at break of the film is lowered, and the effect of improving impact resistance may be insufficient. When the amount of the copolymerized component is higher than 50 mol %, heat resistance may be significantly lowered. The copolymerization composition of such copolymer can be measured by NMR.

Although the mode of copolymerization of the above component with the copolymerized component in the copolymerized polyphenylene sulfide used in the present invention is not particularly limited, the copolymerized polyphenylene sulfide is preferably a random copolymer.

In the present invention, the rest of the copolymer repeating units constituting the copolymerized polyphenylene sulfide may be composed of other copolymerizable units which in a trifunctional phenyl sulfide represented by formula (7), for example, are preferably not higher than 1 mol based on the whole of the copolymer.

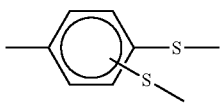

The method of polymerizing copolymerized PPS includes for example the following method: Sodium sulfide and p-dichlorobenzene and minor monomer are compounded at the ratio defined in the present invention and reacted at high temperature at high pressure in the presence of a polymerization assistant in an amide polar solvent such as N-methyl-2-pyrrolidone (NMP). The minor monomer includes:

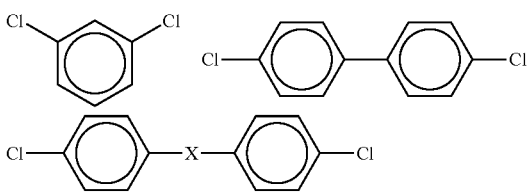

wherein X represents an alkylene, CO or $SO_2$ unit.

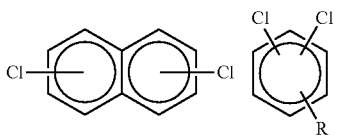

wherein R represents an alkyl, nitro, phenylene or alkoxy group, and a plurality of these minor monomers may be present. Preferably, the minor monomer is:

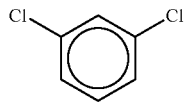

The melting point of the copolymerized polyphenylene sulfide used in the present invention is preferably 180 to 260° C., more preferably 200 to 250° C., still more preferably 220 to 240° C. When the melting point is less than 180° C., heat resistance may be significantly lowered, while when the melting point is higher than 260° C., interlayer adhesion cannot be sufficiently increased, so the laminated sheet may not be highly elongated.

In respect of the balance among the tensile elongation at break, impact resistance and reduced cracking in slot processing of the laminated sheet, the thickness of the layer other than the outermost layer in the laminated polyarylene sulfide sheet of the present invention is preferably 2 to 30% based on the total thickness of the laminated sheet. The thickness is more preferably 5 to 30%, more preferably 10 to 20%. When the thickness of the layer other than the outermost layer is less than 2% based on the total thickness, the impact resistance of the laminated film is lowered and film cracking may be generated, while when the thickness is greater than 30%, the tensile elongation at break of the laminated film is reduced and film cracking may be generated increasingly in slot processing.

The thickness of the layer in the laminated polyarylene sulfide sheet of the present invention can be measured for example by preparing a section of the laminated sheet by ultramicrotomy etc. and examining the sheet section with an optical microscope or a scanning electron microscope.

The tensile elongation at break of the laminated polyarylene sulfide sheet of the present invention both in the longitudinal direction (MD) and in the width direction (TD) is preferably 80 to 250(%). The tensile elongation at break thereof in least one of the longitudinal and width directions is more preferably 110 to 250%. The tensile elongation at break thereof in both of the longitudinal and width directions is still more preferably 110 to 230(%), most preferably 120 to 200 (%). For attaining the preferable range of tensile elongation at break, the content of the thermoplastic resin A, the average particle diameter of the dispersed phase and the laminate structure or thickness of the laminated sheet are preferably controlled in the preferable range of the present invention. When the tensile elongation at break in both the longitudinal and width directions is less than 80(%), the film is poor in ductility for processing for use as a motor slot liner or wedge and is thus broken or practically not usable in some cases. For obtaining a film having a tensile elongation at break of greater than 250(%) in both the longitudinal and width directions of the film, the draw ratio should be decreased in the drawing process, but the planarity of the film may be deteriorated or the mechanical strength may be decreased to lower the nerve of the film in some cases.

The impact strength of the laminated polyarylene sulfide sheet of the present invention is preferably 3 to 10 N/μm, more preferably 4 to 10 N/μm, still more preferably 5 to 10 N/μm, in order to suppress cracking of the film in a step of processing a slot and wedge. When the impact resistance is less than 3 N/μm, film cracking may be generated in a step of processing a slot and wedge, while when the impact strength is higher than 10 N/μm, the content of the non-oriented polyarylene sulfide layer in the laminated polyarylene sulfide sheet may be high, and thus the heat resistance of the laminated sheet may be lowered. The tensile elongation at break of the laminated sheet may be lowered, and film cracking may be generated in a step of processing a slot and wedge.

The impact strength is determined by cutting a test sample of width 1 mm×length 70 mm and measuring it at a test temperature of 23° C. with a Charpy impact tester (capacity, 10 kg·cm; hammer weight, 1.019 kg; lifting angle of a hammer without a sample, 127°; distance from shaft center to gravity center, 6.12 cm). The impact strength is expressed in the unit N/μm after dividing the measured value by the sectional area of the sample (sample thickness×sample width). 7 samples were measured to determine their average.

The laminated polyarylene sulfide sheet of the present invention may contain other components such as a heat stabilizer, an antioxidant, an ultraviolet absorber, an antistatic agent, a flame retardant, pigment, dye, and an organic lubricant such as fatty ester and wax insofar as the advantages of the present invention are not reduced. In order to impart slipability, wear resistance, and/or scratch resistance to surface of the film, the film may contain inorganic or organic particles. Such additives may contain inorganic particles such as those of clay, mica, titanium oxide, calcium carbonate, kaolin, talc, wet- or dry-process silica, colloidal silica, calcium phosphate, barium sulfate, alumina and zirconia, organic particles composed of acrylates, styrene etc., internal particles to be precipitated by a catalyst etc. added at the time of polymerization reaction of polyarylene sulfide, and a surfactant.

The laminated polyarylene sulfide sheet of the present invention can be used in various industrial materials, for example an electrical insulating material for a motor, a transformer etc., a circuit board material, a step/release material for circuit/optical element etc., a protective film, a lithium ion battery material and a fuel battery material. More specifically, it can be used in an electrical insulating material for a hot-water supplier motor, a motor for car air conditioner and a driving motor used in a hybrid car.

The method of producing the biaxially oriented polyphenylene sulfide film of the present invention wherein nylon 6 that is polyamide is used as thermoplastic resin A and mixed with poly-p-phenylene sulfide is described by reference to production of the biaxially oriented polyphenylene sulfide film, but the present invention is naturally not limited to the following description.

When the polyphenylene sulfide is mixed with nylon 6, a method of preliminarily melt-kneading (pelletizing) a mixture of the respective resins into master chips before melt-extrusion is preferably used.

In the present invention, the above PPS and nylon 6 are introduced preferably into a twin-screw extruder to produce a blend material having a weight ratio of PPS to nylon 6 in the range of 99/1 to 60/40. The method of mixing and kneading the resin composition as blend material is not particularly limited, and various mixing and kneading means are used. For example, the PPS and nylon 6 may be separately fed to different melt extruders and then mixed, or alternatively, powdery raw materials may be subjected to the preliminary dry blending utilizing a mixing unit such as a Henschel mixer, a ball mixer, a blender, or a tumbler in advance and then melt-kneaded with a melt-kneader. Thereafter, the blend material, if necessary together with PPS and their recycled material, is introduced into an extruder to produce an intended composition which is preferably used as the raw material from the viewpoint of film quality and film formability. When the raw material is prepared, the resin can be subjected preferably to filtration in the melt-extrusion step in order to reduce contamination of the films with foreign matters to the minimum degree. Various filters for removing foreign matters and/or deteriorated polymer matters in the extruder are preferably those made of materials such as sintered metal, porous ceramic, sand or gauze. In order to improve quantitative feeding, a gear pump may be arranged, if necessary. When the laminated film is produced, two or more extruders and a manifold or a confluent block are used to laminate the polyphenylene sulfide with the resin composition of thermoplastic resin A in a molten state. The molten sheet is extruded from a slit of a die and cooled on a casting roll to produce an unstretched film.

More specific conditions for the preferable method of producing the biaxially oriented polyphenylene sulfide film are as follows:

First, polyphenylene sulfide pellets or granules and polyamide pellets are mixed in a predetermined ratio, fed to a vented twin-screw extruder and melt-kneaded to give blend chips. A high-shear mixer giving shear stress, such as a twin-screw extruder, is preferably used, and from the viewpoint of reducing insufficient dispersing, the mixer is preferably a 3- or 2-thread twin-screw extruder wherein the retention time is preferably in the range of 1 to 5 minutes. The kneading zone is preferably in the temperature range of 290 to 340° C., more preferably 295 to 330° C., still more preferably 300 to 320° C. When the kneading zone is set in the preferable temperature range, the shear stress can be easily increased, insufficient dispersing can be reduced, and the particle diameter of the dispersed phase can be controlled in the preferable range of the present invention. The number of revolutions of the screw is preferably in the range of 100 to 500 rpm, more preferably 200 to 400 rpm. By setting the number of revolutions of the screw in the preferably range, high shear stress can be easily applied, and the particle diameter of the dispersed phase can be controlled in the preferable range of the present invention. The ratio (screw length/screw diameter ratio) of the twin-screw extruder is preferably in the range of 20 to 60, more preferably in the range of 30 to 50. The twin-screw extruder is provided preferably with a kneading zone with a kneading paddle for increasing kneading power, more preferably with two or more kneading zones having a usual feed screw therebetween.

When a composition having polyphenylene sulfide mixed with nylon 6, or a compatibilizing agent, is added in mixing polyphenylene sulfide with nylon 6, insufficient dispersing can be reduced to increase compatibilizability in some cases.

Thereafter, blend chips consisting of PPS and nylon 6, obtained by the pelletizing operation described above, is mixed if necessary with a predetermined amount of PPS or a recycled material after film making and then dried at 180° C. for 3 hours or more under vacuum and then introduced into an extruder having a melting zone heated at a temperature of 300 to 350° C., preferably 320 to 340° C. Thereafter, the melted polymer from the extruder is passed through a filter and discharged through a slit of a T-die to give a sheet-shaped polymer. The temperature of the filter and die is set higher preferably by 3 to 20° C., more preferably by 5 to 15° C., than the melting zone of the extruder. By setting the temperature of the filter and die higher than the temperature of the melting zone in the extruder, abnormal retention can be suppressed and the sheet can have the preferable particle diameter of the dispersed phase in the present invention. The sheet-shaped polymer is cooled and solidified by allowing it to be in contact with a cooling drum having a surface temperature of 20 to 70° C., whereby an unstretched film that is not substantially oriented is obtained.

Then, this unstretched film is biaxially stretched and thereby biaxially oriented. As the stretching method, it is possible to use a sequential biaxial stretching process (stretching process including a step of performing longitudinal stretching and then performing transverse stretching) and a simultaneous biaxial stretching process (stretching process including a step of simultaneously performing longitudinal stretching and transverse stretching), which may be used alone or in combination.

The sequential biaxial stretching process (stretching process including a step of performing longitudinal stretching and then performing transverse stretching) is used herein. The stretching temperature varies depending on constituents in PPS and other thermoplastic resin A, and the process is described below by reference to a resin composition consisting of 90 parts by weight of PPS and 10 parts by weight of nylon 6, for example.

An unstretched polyphenylene sulfide film is heated with a group of heating rolls and then stretched at a draw ratio of 2 to 4, preferably 2.5 to 4, more preferably 3 to 4 in one step or multiple steps in the longitudinal direction (MD stretching). The stretching temperature is in the range of Tg (glass transition temperature of PPS) to (Tg+50)° C., preferably (Tg+5) to (Tg+50)° C., more preferably (Tg+5) to (Tg+40)° C., still more preferably (Tg+10) to (Tg+30)° C., most preferably (Tg+15) to (Tg+30)° C. Thereafter, the film is cooled with a group of cooling rolls at 20 to 50° C.

After MD stretching, a method of stretching the film in the width direction with a tenter is generally used, for example. By retaining both ends of the resulting film with clips, the film is introduced into a tenter and stretched in the width direction (TD stretching). The stretching temperature is preferably in the range of Tg to (Tg+60) ° C., more preferably (Tg+5) to (Tg+50) ° C., still more preferably (Tg+10) to (Tg+40) ° C. Particularly, the film is stretched in TD stretching, preferably at a temperature lower by 3 to 15° C., more preferably by 5 to 10° C., than the stretching temperature in MD stretching. By setting the stretching temperature in TD stretching in the preferable range, crystallization of polyarylene sulfide is not progressed excessively, whereby the molecular-chain orientation can be controlled in the range of the present invention and the effect of the invention, that is, improvement of tensile elongation at break and improvement of molding processability, can be easily attained. In a preheating zone before the stretching zone in TD stretching, the film is stretched preferably at a preheating temperature lower by 3 to 10° C., more preferably by 5 to 7° C., than the stretching temperature in TD stretching. By setting the preheating temperature in the preferable range before TD stretching, crystallization of polyarylene sulfide is not progressed excessively, whereby the molecular-chain orientation can be controlled in the range of the present invention and the effect of the invention, that is, improvement of fracture elongation and improvement of molding processability, can be easily attained. The draw ratio is preferably in the range of 2 to 4, more preferably 2.5 to 4, still more preferably 3 to 4.

Then, the stretched film is heat-set under strain or under relaxation in the width direction. The heat treatment temperature is preferably in the range of 200 to 270° C., more preferably 210 to 260° C., still more preferably 220 to 255° C. Heat treatment is carried out preferably in 2 stages at different temperatures. In this case, the heat treatment temperature in the second stage is preferably set higher by 5 to 20° C. than in the first stage. The heat treatment is carried out preferably for 0.2 to 30 seconds, more preferably for 5 to 20 seconds. The film is cooled under relaxation in the width direction at a temperature zone of 40 to 180° C. The degree of relaxation is preferably in the range of 1 to 10%, more preferably 2 to 8%, still more preferably 3 to 7%, from the viewpoint of reducing the degree of thermal shrinkage in the width direction.

Then, the film is cooled to room temperature, if necessary under relaxation treatment in the longitudinal and width directions, and then wounded to give the objective biaxially oriented polyphenylene sulfide film.

The method of laminating the non-oriented polyphenylene sulfide layer (layer b) with the biaxially oriented polyphenylene sulfide layer (layer a) includes a method of using an adhesive resin such as an adhesive or a method of thermocompression bonding at high temperature at high pressure, and a method of thermocompression bonding of the two at high temperature at high pressure without using an adhesive can be particularly used. The method of thermocompression bonding is carried out with heating rolls or by hot plate pressing, preferably by heating rolls from the viewpoint of production process. Thermocompression bonding conditions are preferably a temperature of 180 to 270° C. and a pressure of 1 to 20 kg/cm$^2$. When the temperature is lower than 180° C., adhesion cannot be sufficiently increased, and when the temperature is higher than 270° C., the planarity of the laminated sheet may be rapidly deteriorated and the mechanical characteristics may be deteriorated. On the other hand, when the pressure is less than 1 kg/cm$^2$, adhesion is insufficient even if the thermocompression bonding temperature is increased, while when the pressure is higher than 20 kg/cm$^2$, the planarity of the laminated sheet may be deteriorated, and the non-oriented polyphenylene sulfide layer may be broken. From the viewpoint of adhesion and mechanical characteristics, the thermocompression bonding temperature is more preferably in the range of 200 to 250° C., still more preferably in the range of 220 to 240° C. The thermocompression bonding pressure is more preferably in the range of 3 to 15 kg/cm$^2$, still more preferably in the range of 5 to 10 kg/cm$^2$, but these ranges are not intended to be limitative.

The method of laminating the copolymerized polyphenylene sulfide layer (layer c) with the biaxially oriented polyphenylene sulfide layer (layer a) includes a method of using an adhesive resin such as an adhesive or a method of thermocompression bonding at high temperature at high pressure, and a method of thermocompression bonding of the two at high temperature at high pressure without using an adhesive can be particularly used. The method of thermocompression bonding is carried out with heating rolls or by hot plate pressing, preferably by heating rolls from the viewpoint of production process. A biaxially stretched laminated film consisting of 2 layers (a/c) or 3 layers (c/a/c), obtained by biaxially stretching a co-extruded sheet having the copolymerized polyphenylene sulfide layer laminated on at least one side of the polyphenylene sulfide layer (layer a) is subjected particularly preferably to thermocompression bonding.

The method of producing the biaxially stretched laminated film having a copolymerized polyphenylene sulfide layer laminated therein is described. The polyphenylene sulfide material and the copolymerized polyphenylene sulfide material are fed to different melting extruders and heated to a temperature not lower than the melting point of each material. The respective materials melted by heating are laminated to give a 2- or 3-layer laminate in melted state in a converging device arranged between the melting extruder and the outlet of a die and then extruded through a slit of the die. The melted laminate is cooled to a temperature not higher than the glass transition point of the polyphenylene sulfide on a cooling drum, to give a substantially amorphous unstretched sheet having 2 or 3 layers laminated therein. The unstretched sheet can be biaxially stretched by the same method as for the polyphenylene sulfide sheet described above.

The 2-layer laminated films each having the polyphenylene sulfide layer (layer a)/copolymerized polyphenylene sulfide layer (layer c) laminated therein are introduced into a heat-fusion device composed of a group of heated rolls and heat-fused such that the biaxially stretched film composed of a/c layer and the biaxially stretched film composed of c/a layer are attached to each other at the side of the copolymerized polyphenylene sulfide layer (layer c) to give a 3-layer laminated sheet of the polyphenylene sulfide layer (layer a)/copolymerized polyphenylene sulfide layer (layer c)/polyphenylene sulfide layer (layer a). When the films are attached to each other at the side of the copolymerized polyphenylene sulfide, the whole of their fused copolymerized polyphenylene sulfide layer is regarded as one layer.

The copolymerized polyphenylene sulfide layer (layer c) in the above 2-layer laminated film (a/c) can be heat-fused with a biaxially oriented polyphenylene sulfide film layer (layer a) to give a laminated sheet of the polyphenylene sulfide layer (layer a)/copolymerized polyphenylene sulfide layer (layer c)/polyphenylene sulfide layer (layer a).

When a 3-layer laminated film consisting of the copolymerized polyphenylene sulfide layer (layer c)/polyphenylene sulfide layer (layer a)/copolymerized polyphenylene sulfide layer (layer c) is used, single, biaxially oriented sulfide film can be heat-fused with both sides of the 3-layer laminated film respectively to give a 5-layer laminated sheet of the polyphenylene sulfide layer (layer a)/copolymerized polyphenylene sulfide layer (layer c)/polyphenylene sulfide layer (layer a)/copolymerized polyphenylene sulfide layer (layer c)/polyphenylene sulfide layer (layer a).

The temperature condition for thermocompression bonding is preferably in the range of (the melting point of copolymerized polyphenylene sulfide) to 280° C., more preferably in the range of (the melting point of copolymerized polyphenylene sulfide +10) ° C. to 280° C. from the viewpoint of adhesion and mechanical characteristics. It is considered that a part of polymer chains constituting the biaxially oriented copolymerized polyolefin sulfide layer is thereby non-oriented. When the thermocompression bonding temperature is lower than the melting point of copolymerized polyphenylene sulfide, adhesion cannot be sufficiently increased in some cases, while when the temperature is higher than 280° C., the planarity of the laminated sheet may be rapidly deteriorated and the mechanical characteristics may be deteriorated. The pressure for thermocompression bonding is preferably 1 to 20 kg/cm$^2$. When the pressure is less than 1 kg/cm$^2$, adhesion is insufficient even if the thermocompression bonding temperature is increased, while when the pressure is higher than 20 kg/cm$^2$, the planarity of the laminated sheet may be deteriorated. The thermocompression bonding pressure is more preferably in the range of 3 to 15 kg/cm$^2$, still more preferably in the range of 5 to 10 kg/cm$^2$, but these ranges are not intended to be limitative.

In a preferable mode of the present invention, the copolymerized polyphenylene sulfide layer and the polyphenylene sulfide layer used in the present invention may be subjected to corona discharge treatment or plasma treatment in order to confer stronger adhesion. In the present invention, another sheet layer may be laminated, if necessary, insofar as the effect of the present invention is not hindered.

The method of measuring characteristic values and the method of evaluating the effect in the present invention are as follows:

(1) Average Particle Diameter and Aspect Ratio of the Dispersed Phase

The film was cut by ultramicrotomy in a direction (A) parallel to the longitudinal direction and perpendicular to the surface of the film, in a direction (B) parallel to the width direction and perpendicular to the surface of the film and in a direction (C) parallel to the surface of the film, to prepare a sample. For clarifying the contrast of the dispersed phase, the sample may be stained with osmic acid, ruthenium acid or phosphotungstic acid. When the thermoplastic resin A is polyamide, staining with phosphotungstic acid was preferably used. Its section was observed under a transmission electron microscope (H-7100FA model manufactured by Hitachi Ltd.) under the condition of an applied voltage of 100 kV, and its photograph was taken at 20,000-fold magnification. The resulting photograph was scan as an image with an image analyzer and arbitrary 100 dispersed phases were selected, and subjected to image processing where appropriate, thereby determining the sizes of the dispersed phases in the following manner. When the number of dispersed phases in one photograph is less than 100, another section in the same direction is observed whereby 100 dispersed phases can be selected. The maximum length (1a) of the individual dispersed phases in the thickness direction of the film and the maximum length (1b) thereof in the longitudinal direction in the section (A), the maximum length (1c) of the individual dispersed phases in the thickness direction of the film and the maximum length (1d) thereof in the width direction in the section (B), and the maximum length (1e) of the individual dispersed phases in the longitudinal direction of the film and the maximum length (1f) thereof in the width direction in the section (C) were determined. Then, when the dispersed phase form index I=(number-average value of 1b+number-average value of 1e)/2, form index J=(number-average value of 1d+number-average value of 1f)/2, and form index K=(number-average value of 1a+number-average value of 1c)/2, the average particle diameter of the dispersed phases was expressed as (I+J+K)/3. Further, the maximum value was determined as the average major axis L and the minimum value as the average minor axis D, from I, J and K, and the aspect ratio of the dispersed phases was expressed as L/D.

(2) Glass Transition Temperature (Tg), Melting Temperature (Tm), Crystal Melting Heat Quantity Samples were measured for specific heat according to JIS K 7121 in a quasi-isothermal mode under the following conditions using the following instrument. The number of the measured samples was three and obtained measurements were averaged.

Instrument: Temperature-modulated DSC manufactured by TA Instruments, Inc.
Measurement conditions:
Heating temperature: 270 to 570 K (RCS Cooling)
Temperature calibration: Melting point of high-purity indium and melting point of high-purity tin
Temperature modulation amplitude: ±1 K
Temperature modulation cycle: 60 seconds
Heating step: 5 K
Sample weight: 5 mg
Sample container: Aluminum open container (22 mg)
Reference container: Aluminum open container (18 mg)

The glass transition points (Tg) of the three samples were calculated using the following equation:

$$Tg=(\text{Extrapolated Initial Glass Transition Temperature}+\text{Extrapolated Final Glass Transition Temperature})/2$$

A differential scanning calorimeter, DSC (RDC 220) manufactured by Seiko Instruments Inc. and a data analyzer, Disk Station (SSC/5200), manufactured by Seiko Instruments Inc. were used. Each 5 mg sample was placed on an aluminum pan, heated from room temperature to 340° C. at a rate of 20° C./min., and the heat quantity of an endothermic peak, observed in this step, was defined as crystal melting heat quantity. Thereafter, the sample was kept molten at 340° C. for 5 minutes, then solidified by quenching, and heated from room temperature at a rate of 20° C./min. The peak temperature of an endothermic peak in melting observed was defined as the melting temperature (Tm).

(3) Tensile Strength at Break, Tensile Elongation at Break

Measurement was performed according to ASTM D-882 with an Instron-type tensile testing machine. Measurement conditions described below were used. Ten samples were measured and obtained measurements were averaged.
Measurement device: Automatic film tensile tester, Tensilon AMF/RTA-100, manufactured by Orientec Co., Ltd.
Sample size: Width of 10 mm and chuck distance of 100 mm
Strain rate: 10 mm/min.
Measurement environment: Temperature of 23° C. and a relative humidity of 65%

(4) Impact Strength

The impact strength is determined by cutting a test sample of width 1 mm×length 70 mm and measuring it at a test temperature of 23° C. with a Charpy impact tester manufactured by Toyo Seiki (capacity, 10 kg·cm; hammer weight, 1.019 kg; lifting angle of a hammer without a sample, 127°; distance from shaft center to gravity center, 6.12 cm). The impact strength is expressed in the unit N/μm after dividing the measured value by the sectional area of the sample (sample thickness×sample width). Seven samples were measured and obtained measurements were averaged.

(5) Peak Temperature at Loss Tangent of Dynamic Viscoelasticity

Using DMS6100 (manufactured by Seiko Instruments Inc.), a sample having a width of 10 mm and a length (chuck distance) of 20 mm (provided that the longitudinal direction of the film is the sample length) was measured under the following conditions.
Measurement temperature range: 30 to 200° C.
Vibrational frequency: 1 Hz
Vibration displacement (strain): 10 (μm)
Temperature increasing rate: 2 (° C./min)

A graph wherein loss tangent (tan δ) from data obtained under the above conditions was plotted against temperature (30 to 200° C.) on the abscissa was prepared, and the temperature at which tan δ became the highest was read as the peak temperature.

(6) Molding Processability

Using a motor processing machine (manufactured by Odawara Engineering Co., Ltd.), a film with a size of 12×80 mm (80 mm in the longitudinal direction of the film) is punched out and creased at a total processing rate of 2 samples/sec., and 1,000 samples were thus prepared and the number of cracks was counted and judged as follows:
Excellent: less than 50 cracks.
Good: 50 to 100 cracks.
Acceptable: 100 to 200 cracks.
Not acceptable: Over 200 cracks.

(7) Melt Viscosity

Using Flow Tester CFT-500 (manufactured by Shimadzu Corporation), measurement was carried out with a die of 10 mm in length, a die diameter of 1.0 mm, for a preheating time of 5 minutes.

EXAMPLES

Reference Example 1

Polymerization of PPS (PPS-1)

A 70-L autoclave equipped with a stirrer was charged with 8,267.37 g (70.00 moles) of 47.5% sodium hydrosulfide, 2,957.21 g (70.97 moles) of 96% sodium hydroxide, 11,434.50 g (115.50 moles) of N-methyl-2-pyrrolidone (NMP), 2,583.00 g (31.50 moles) of sodium acetate and 10,500 g deionized water, and the mixture was gradually heated to 245° C. over about 3 hours at normal pressures with nitrogen passing into it, and after 14,780.1 g water and 280 g NMP were distilled away, the reaction container was cooled to 160° C. The amount of water remaining in the system, including water consumed in hydrolysis of NMP, was 1.06 moles per mole of the alkali metal sulfide charged. The amount of hydrogen sulfide scattered was 0.02 mol per mol of the alkali metal sulfide charged.

Then, 10,235.46 g (69.63 moles) of p-dichlorobenzene and 9,009.00 g (91.00 moles) of NMP were added, and the reaction container was sealed under a nitrogen gas and heated to 238° C. at a rate of 0.6° C./min. under stirring at 240 rpm. After reaction at 238° C. for 95 minutes, the reaction mixture was heated to 270° C. at a rate of 0.8° C./min. After reaction at 270° C. for 100 minutes, 1,260 g (70 moles) of water was pressed over 15 minutes into the reaction container which was then cooled to 250° C. at a rate of 1.3° C./min. Thereafter, the reaction mixture was cooled to 200° C. at a rate of 1.0° C./min. and then rapidly cooled to a temperature in the vicinity of room temperature.

The reaction mixture was removed, diluted with 26,300 g NMP and then separated into the solvent and solids through a screen (80 mesh), and the resulting particles were washed with 31,900 g NMP and separated by filtration. These particles were washed several times with 56,000 g deionized water, separated by filtration and washed with 70,000 g of 0.05 wt % aqueous acetic acid and separated by filtration. The particles were washed with 70,000 g deionized water and then separated by filtration, and the resulting water-containing PPS particles were dried with hot air at 80° C. and then dried under reduced pressure at 120° C. The resulting PPS has a melt viscosity of 200 Pa·s (310° C., 1,000/s shear rate), a glass transition temperature of 90° C. and a melting point of 285° C.

Reference Example 2

Preparation of Copolymerized PPS Composition (PPS-2)

An autoclave was charged with 100 moles of sodium sulfide.9H$_2$O, 45 moles of sodium hydroxide and 25-L N-methyl-2-pyrrolidone (referred to hereinafter as NMP), and the mixture was gradually heated to 220° C. under stirring to remove the contained water by distillation.

The system after conclusion of dehydration was charged with 86 moles of p-dichlorobenzene as a main monomer, 15 moles of m-dichlorobenzene as a minor monomer and 0.2 mole of 1,2,4-trichlorobenzene, together with 5-L NMP, then filled at 170° C. with 3 kg/cm$^2$ nitrogen under pressurization, and heated to polymerize the mixture at 260° C. for 4 hours. After the polymerization was finished, the reaction mixture was cooled to precipitate the polymer in distilled water, which was then passed thorough a gauze having 150-mesh openings to recover a small massive polymer.

This polymer was washed 5 times with distilled water at 90° C. and dried at 120° C. under reduced pressure to give a white particulate copolymerized PPS composition having a melting point of 240° C.

Reference Example 3

Preparation of Copolymerized PPS Composition (PPS-3)

An autoclave was charged with 100 moles of sodium sulfide.9H$_2$O, 45 moles of sodium hydroxide and 25-L NMP, and the mixture was gradually heated to 220° C. under stirring to remove the contained water by distillation.

The system after conclusion of dehydration was charged with 94.8 moles of p-dichlorobenzene as a main monomer, 5 moles of m-dichlorobenzene as a minor monomer and 0.2 mole of 1,2,4-trichlorobenzene, together with 5-L NMP, then filled at 170° C. with 3 kg/cm$^2$ nitrogen under pressurization, and heated to polymerize the mixture at 260° C. for 4 hours. After the polymerization was finished, the reaction mixture was cooled to precipitate the polymer in distilled water, which was then passed thorough a gauze having 150-mesh openings to recover a small massive polymer.

This polymer was washed 5 times with distilled water at 90° C. and dried at 120° C. under reduced pressure to give a white particulate copolymerized PPS composition having a melting point of 260° C.

Reference Example 4

Polyamide-1 (PA-1), Nylon 6/66 Copolymer 50 wt % aqueous adipic acid/hexamethylene diamine salt (AH salt) solution, and ∈-caprolactam (CL), were mixed to give a mixture of 20 parts by weight of the AH salt and 80 parts by weight of CL and then charged into a 30-L autoclave. The mixture was heated to 270° C. at an internal pressure of 10 kg/cm$^2$ and then gradually depressurized to 0.5 kg/cm$^2$ under stirring while the internal temperature was kept at 245° C., and then stirring was terminated. After the reaction system was allowed to reach normal pressures with nitrogen, the reaction mixture was extruded into strands to form pellets which were then subjected to extraction with boiling water to remove unreacted materials, and then dried. The copolymer polyamide 6/66 resin thus obtained had a relative viscosity of 4.20 and a melting point of 193° C.

Reference Example 5

Non-Oriented Polyphenylene Sulfide Film (Sheet)

The PPS composition obtained as described above (Reference Example 1) was dried at 180° C. for 3 hours under reduced pressure at 1 mmHg, fed to an extruder, melted at 310° C., filtered with a 95%-cutting filter of pore diameter of 10 μm using a metal fiber, and then the discharge rate was regulated with a device in an upper part of a die so as to form the PPS composition (50 μm), and was discharged via a T-die slit of 400 mm in width having linear lips with a distance of 1.0 mm. The molten sheet thus extruded was cooled and solidified by intimate contact with a metallic drum with a surface kept at 25° C. in such a manner that the sheet was statically charged, whereby a non-oriented polyphenylene sulfide sheet of 50 μm in thickness was obtained.

Reference Example 6

Non-Oriented Polyphenylene Sulfide Film (Sheet)

A non-oriented polyphenylene sulfide sheet was obtained in the same manner as in Reference Example 5 except that its thickness was made 70 μm.

Reference Example 7

Non-Oriented Polyphenylene Sulfide Film (Sheet)

A non-oriented polyphenylene sulfide sheet was obtained in the same manner as in Reference Example 5 except that its thickness was made 80 μm.

Reference Example 8

Non-Oriented Polyphenylene Sulfide Film (Sheet)

A non-oriented polyphenylene sulfide sheet was obtained in the same manner as in Reference Example 5 except that its thickness was made 120 μm.

Example 1

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 310° C. The mixture was melt-extruded into strands at a screw speed of 300 rpm and a residence time of 90 seconds, then cooled with water at a temperature of 25° C. and immediately cut into blend chips. 0.3 wt % calcium carbonate powder having an average particle diameter of 1.2 μm and 0.05 wt % calcium stearate were added to, and uniformly mixed with, the blend chips of PPS/PA-1 (90/10 wt %), and the resulting blended material, designated resin X, was dried at 180° C. for 3 hours under reduced pressure and then fed to a full-flight single-screw extruder having a melting zone heated at 320° C. The polymer melted in the extruder was filtered through a filter set at a temperature of 330° C., melt-extruded through a slit of a T-die set at a temperature of 330° C. and cooled and solidified by intimate contact with a cast drum having a surface temperature of 25° C. in such a manner that the extrudate was statically charged, whereby an unstretched film was prepared.

The unstretched film was stretched at a temperature of 103° C. and a draw ratio of 3.5 in the longitudinal direction of the film by using a difference in rotation speed between rolls in a stretching machine including a plurality of groups of heated rolls. Thereafter, both ends of the resulting film were retained with clips and the film was stretched at a stretching temperature of 105° C. and a draw ratio of 3.5 with a tenter in the width direction of the film and then heat-treated at a temperature of 260° C. for 2 seconds. Thereafter, the resulting film was relaxed by 4% in the transverse direction in a cooling zone maintained at 150° C. and then cooled to room temperature, followed by removing film edges, whereby a biaxially oriented PPS film of 125 μm was prepared.

As shown in the results of measurement and evaluation of the structure and properties of the resulting biaxially oriented PPS film in Table 1, this biaxially oriented polyphenylene sulfide film was excellent in tensile elongation and molding processability.

Examples 2 and 3

A biaxially oriented polyphenylene sulfide film was obtained in the same manner as in Example 1 except that the amount of PA-1 added as thermoplastic resin A was changed as shown in Table 1. As shown in the results of measurement and evaluation of the structure and properties of the resulting biaxially oriented PPS film in Table 1, this biaxially oriented polyphenylene sulfide film was excellent in tensile elongation and molding processability.

Example 4

A biaxially oriented polyphenylene sulfide film was obtained in the same manner as in Example 1 except that nylon 6 (CM1001 manufactured by Toray Industries, Inc.) (polyamide-2 (PA-2)) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 5

A biaxially oriented polyphenylene sulfide film was obtained in the same manner as in Example 1 except that nylon 12 (CM5051F manufactured by Toray Industries, Inc.) (polyamide-3 (PA-3)) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 6

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 325° C. The mixture was melt-extruded into strands at a screw speed of 300 rpm and a residence time of 90 seconds, then cooled with water at a temperature of 25° C. and immediately cut into blend chips. Thereafter, an unstretched film was obtained in the same manner as in Example 1, and a biaxially oriented PPS film of 125 μm in thickness was prepared.

As shown in the results of measurement and evaluation of the structure and properties of the resulting biaxially oriented PPS film in Table 1, this biaxially oriented polyphenylene sulfide film was excellent in tensile elongation and molding processability.

Example 7

The PPS resin X obtained in Example 1 was dried at 180° C. for 3 hours under reduced pressure and then fed to an extruder having a melting zone heated at 320° C., and the polymer melted in the extruder was filtered through a filter set at a temperature of 330° C., melt-extruded through a slit of a T-die set at a temperature of 320° C. and cooled and solidified by intimate contact with a cast drum having a surface temperature of 25° C. in such a manner that the extrudate was statically charged, whereby an unstretched film was prepared.

This unstretched film was formed into a biaxially oriented PPS film of 125 μm in thickness by the same method as in Example 1.

As shown in the results of measurement and evaluation of the structure and properties of the resulting biaxially oriented PPS film in Table 1, this biaxially oriented polyphenylene sulfide film was excellent in tensile elongation and molding processability.

Example 8

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Further, 0.5 part by weight of γ-isocyanate propyltriethoxysilane (KBE9007, manufactured by Shin-Etsu Chemical Co., Ltd.) was incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 310° C. The mixture was melt-extruded into strands at a screw speed of 300 rpm and a residence time of 90 seconds, then cooled with water at a temperature of 25° C. and immediately cut into blend chips Y. 0.3 wt % calcium carbonate powder having an average particle diameter of 1.2 μm and 0.05 wt % calcium stearate were added to and were uniformly dispersed in and blended with the blend chips Y of PPS/PA-1 (90/10 wt %), and the resulting blended material was dried at 180° C. for 3 hours under reduced pressure and then fed to a full-flight single-screw extruder having a melting zone heated at 320° C. The polymer melted in the extruder was filtered through a filter set at a temperature of 330° C., melt-extruded through a slit of a T-die set at a temperature of 330° C. and cooled and solidified by intimate contact with a cast drum having a surface temperature of 25° C. in such a manner that the extrudate was statically charged, whereby an unstretched film was prepared.

This unstretched film was formed into a biaxially oriented PPS film of 125 μm in thickness by the same method as in Example 1.

As shown in the results of measurement and evaluation of the structure and properties of the resulting biaxially oriented PPS film in Table 1, this biaxially oriented polyphenylene sulfide film was excellent in tensile elongation and molding processability.

Example 9

90 parts by weight of the PPS resin prepared in Reference Example 1 were dried at 180° C. for 3 hours under reduced pressure, and as thermoplastic resin A, 10 parts by weight of nylon 610 (Amilan CM2001, manufactured by Toray Industries, Inc.) (polyamide-4 (PA-4)) were dried at 120° C. for 3 hours under reduced pressure. Further, 0.5 part by weight of γ-isocyanate propyltriethoxysilane (KBE9007, manufactured by Shin-Etsu Chemical Co., Ltd.) was incorporated as a compatibilizing agent into 100 parts by weight of the PPS resin and the nylon 610 in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 310° C. The mixture was melt-extruded into strands at a screw speed of 300 rpm and a residence time of 90 seconds, then cooled with water at a temperature of 25° C. and immediately cut into blend chip resin Z. 0.3 wt % calcium carbonate powder having an average particle diameter of 1.2 μm and 0.05 wt % calcium stearate were added to and were uniformly dispersed in and blended with the blend chip resin Z of PPS/PA-1 (90/10 wt %), and the resulting blended material was dried at 180° C. for 3 hours under reduced pressure and then fed to a full-flight single-screw extruder having a melting zone heated at 320° C. The polymer melted in the extruder was filtered through a filter set at a temperature of 330° C., melt-extruded through a slit of a T-die set at a temperature of 330° C. and cooled and solidified by intimate contact with a cast drum having a surface temperature of 25° C. in such a manner that the extrudate was statically charged, whereby an unstretched film was prepared.

This unstretched film was formed into a biaxially oriented PPS film of 125 μm in thickness by the same method as in Example 1.

As shown in the results of measurement and evaluation of the structure and properties of the resulting biaxially oriented PPS film in Table 1, this biaxially oriented polyphenylene sulfide film was excellent in tensile elongation and molding processability.

Example 10

An unstretched film obtained in the same manner as in Example 9 was stretched at a temperature of 107° C. and a draw ratio of 3.0 in the longitudinal direction of the film by using a difference in rotation speed between rolls in a stretching machine including a plurality of groups of heated rolls. Thereafter, both ends of the resulting film were retained with clips and the film was stretched at a stretching temperature of 105° C. and a draw ratio of 3.5 with a tenter in the width direction of the film and then heat-treated at a temperature of 260° C. for 10 seconds. Thereafter, the resulting film was relaxed by 4% in the transverse direction in a cooling zone maintained at 150° C. and then cooled to room temperature, followed by removing film edges, whereby a biaxially oriented PPS film of 125 μm in thickness was prepared.

As shown in the results of measurement and evaluation of the structure and properties of the resulting biaxially oriented PPS film in Table 1, this biaxially oriented polyphenylene sulfide film was excellent in tensile elongation and molding processability.

Example 11

An unstretched film obtained in the same manner as in Example 9 was stretched at a temperature of 107° C. and a draw ratio of 3.0 in the longitudinal direction of the film by using a difference in rotation speed between rolls in a stretching machine including a plurality of groups of heated rolls. Thereafter, both ends of the resulting film were retained with clips and the film was stretched at a stretching temperature of 100° C. and a draw ratio of 3.0 with a tenter in the width direction of the film and then heat-treated at a temperature of 260° C. for 10 seconds. Thereafter, the resulting film was relaxed by 4% in the transverse direction in a cooling zone maintained at 150° C. and then cooled to room temperature, followed by removing film edges, whereby a biaxially oriented PPS film of 125 μm in thickness was prepared.

As shown in the results of measurement and evaluation of the structure and properties of the resulting biaxially oriented PPS film in Table 1, this biaxially oriented polyphenylene sulfide film was excellent in tensile elongation and molding processability.

Example 12

An unstretched film obtained in the same manner as in Example 9 was stretched at a temperature of 107° C. and a draw ratio of 3.0 in the longitudinal direction of the film by using a difference in rotation speed between rolls in a stretching machine including a plurality of groups of heated rolls. Thereafter, both ends of the resulting film were retained with clips and the film was stretched at a stretching temperature of 100° C. and a draw ratio of 3.0 with a tenter in the width direction of the film and then heat-treated at a temperature of 250° C. for 10 seconds. Thereafter, the resulting film was relaxed by 4% in the transverse direction in a cooling zone maintained at 150° C. and then cooled to room temperature, followed by removing film edges, whereby a biaxially oriented PPS film of 125 μm in thickness was prepared.

As shown in the results of measurement and evaluation of the structure and properties of the resulting biaxially oriented PPS film in Table 1, this biaxially oriented polyphenylene sulfide film was excellent in tensile elongation and molding processability.

Example 13

A biaxially oriented polyphenylene sulfide film was obtained in the same manner as in Example 12 except that the amount of PA-4 added as thermoplastic resin A was changed to 5 parts by weight as shown in Table 1.

As shown in the results of measurement and evaluation of the structure and properties of the resulting biaxially oriented PPS film in Table 1, this biaxially oriented polyphenylene sulfide film was excellent in tensile elongation and molding processability.

Example 14

A biaxially oriented polyphenylene sulfide film was obtained in the same manner as in Example 1 except that polyetherimide (PEI) (Ultem 1010, produced by GE Plastics) (glass transition temperature 215° C.) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 15

A biaxially oriented polyphenylene sulfide film was obtained in the same manner as in Example 1 except that polysulfone (PSF) (UDEL, produced by Amoco) (glass transition temperature 190° C.) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 16

A biaxially oriented polyphenylene sulfide film was obtained in the same manner as in Example 1 except that polyether sulfone (PES) (RADEL, produced by Amoco) (glass transition temperature 225° C.) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 17

A biaxially oriented polyphenylene sulfide film was obtained in the same manner as in Example 12 except that polyether imide (PEI) (Ultem 1010, produced by GE Plastics) (glass transition temperature 215° C.) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 18

A biaxially oriented polyphenylene sulfide film was obtained in the same manner as in Example 12 except that polysulfone (PSF) (UDEL, produced by Amoco) (glass transition temperature 190° C.) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Example 19

A biaxially oriented polyphenylene sulfide film was obtained in the same manner as in Example 12 except that polyether sulfone (PES) (RADEL, produced by Amoco) (glass transition temperature 225° C.) was used as thermoplastic resin A. As shown in the results of measurement and evaluation of the structure and properties of the resulting biaxially oriented PPS film in Table 1, this biaxially oriented polyphenylene sulfide film was excellent in tensile elongation and molding processability.

Comparative Example 1

A biaxially oriented film was obtained in the same manner as in Example 1 except that only the polyphenylene sulfide resin obtained in Reference Example 1 was used. The resulting biaxially oriented polyphenylene sulfide film, as shown in the results of measurement and evaluation of the structure and properties thereof in Table 1, was a film poor in tensile elongation and molding processability.

Comparative Example 2

A biaxially oriented polyphenylene sulfide film was obtained in the same manner as in Example 1 except that the compatibilizing agent was not added. The resulting biaxially oriented polyphenylene sulfide film, as shown in the results of measurement and evaluation of the structure and properties thereof in Table 1, was a film poor in tensile elongation and molding processability.

Comparative Example 3

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 310° C. The mixture was melt-extruded into strands at a screw speed of 80 rpm and a residence time of 90 seconds, then cooled with water at a temperature of 25° C. and immediately cut into blend chips. Thereinafter, a biaxially oriented polyphenylene sulfide film was obtained in the same manner as in Example 1.

The resulting biaxially oriented polyphenylene sulfide film, as shown in the results of measurement and evaluation of the structure and properties thereof in Table 1, was a film poor in tensile elongation and molding processability.

Comparative Example 4

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 350° C. The mixture was melt-extruded into strands at a screw speed of 300 rpm and a residence time of 90 seconds, then cooled with water at a temperature of 25° C. and immediately cut into blend chips. Thereinafter, an unstretched film was obtained in the same manner as in Example 1, and a biaxially oriented PPS film of 125 μm in thickness was prepared.

The resulting biaxially oriented PPS film, as shown in the results of measurement and evaluation of the structure and properties thereof in Table 1, was a film poor in molding processability.

Comparative Example 5

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a full-flight single-screw extruder heated at 310° C. (screw diameter 40 mm, manufactured by Tanabe Plastics Machinery Co., Ltd) and melt-extruded into strands at a screw speed of 80 rpm and a residence time of 90 seconds, then cooled with water at a temperature of 25° C. and immediately cut into blend chips. Thereinafter, a biaxially oriented polyphenylene sulfide film was obtained in the same manner as in Example 1.

The resulting biaxially oriented polyphenylene sulfide film, as shown in the results of measurement and evaluation of the structure and properties thereof in Table 1, was a film poor in tensile elongation and molding processability.

Comparative Example 6

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. 100 parts by weight of the PPS resin and the nylon 6/66 copolymer in total were blended with 2 parts by weight of bisphenol A type epoxy resin (Epikote 1004, manufactured by Yuka Shell Epoxy Co., Ltd.), 0.3 wt % calcium carbonate powder having an average particle diameter of 1.2 µm and 0.05 wt % calcium stearate, and the resulting blended material was fed to a full-flight single-screw extruder having a melting zone heated at 320° C. The polymer melted in the extruder was filtered through a filter set at a temperature of 330° C., melt-extruded through a slit of a T-die set at a temperature of 330° C. and cooled and solidified by intimate contact with a cast drum having a surface temperature of 25° C. in such a manner that the extrudate was statically charged, whereby an unstretched film was prepared. The resulting unstretched film was formed into a biaxially oriented polyphenylene sulfide film in the same manner as in Example 1.

The resulting biaxially oriented polyphenylene sulfide film, as shown in the results of measurement and evaluation of the structure and properties thereof in Table 1, was a film poor in tensile elongation and molding processability.

Comparative Examples 7 to 9

A biaxially oriented polyphenylene sulfide film was obtained in the same manner as in Example 1 except that the amount of PA-1 added as thermoplastic resin A was changed as shown in Table 1. As shown in the results of measurement and evaluation of the structure and properties of the resulting biaxially oriented PPS film in Table 1, this biaxially oriented polyphenylene sulfide film was a film poor in tensile elongation and molding processability.

Comparative Example 10

An unstretched film obtained in the same manner as in Example 9 was stretched at a temperature of 107° C. and a draw ratio of 3.0 in the longitudinal direction of the film by using a difference in rotation speed between rolls in a stretching machine including a plurality of groups of heated rolls. Thereafter, both ends of the resulting film were retained with clips and the film was stretched at a stretching temperature of 100° C. and a draw ratio of 3.0 with a tenter in the width direction of the film and then heat-treated at a temperature of 285° C. for 10 seconds. Thereafter, the resulting film was relaxed by 4% in the transverse direction in a cooling zone maintained at 150° C. and then cooled to room temperature, followed by removing film edges, whereby a biaxially oriented PPS film of 125 µm in thickness was prepared. As shown in the results of measurement and evaluation of the structure and properties of the resulting biaxially oriented PPS film in Table 1, this biaxially oriented polyphenylene sulfide film was a film poor in tensile elongation and molding processability.

Comparative Example 11

An unstretched film obtained in the same manner as in Example 9 was stretched at a temperature of 103° C. and a draw ratio of 4.2 in the longitudinal direction of the film by using a difference in rotation speed between rolls in a stretching machine including a plurality of groups of heated rolls. Thereafter, both ends of the resulting film were retained with clips and the film was stretched at a stretching temperature of 100° C. and a draw ratio of 3.0 with a tenter in the width direction of the film and then heat-treated at a temperature of 260° C. for 10 seconds. Thereafter, the resulting film was relaxed by 4% in the transverse direction in a cooling zone maintained at 150° C. and then cooled to room temperature, followed by removing film edges, whereby a biaxially oriented PPS film of 125 µm in thickness was prepared. As shown in the results of measurement and evaluation of the structure and properties of the resulting biaxially oriented PPS film in Table 1, this biaxially oriented polyphenylene sulfide film was a film poor in tensile elongation and molding processability.

Comparative Example 12

An unstretched film obtained in the same manner as in Example 9 was stretched at a temperature of 107° C. and a draw ratio of 3.0 in the longitudinal direction of the film by using a difference in rotation speed between rolls in a stretching machine including a plurality of groups of heated rolls. Thereafter, both ends of the resulting film were retained with clips and the film was stretched at a stretching temperature of 105° C. and a draw ratio of 4.2 with a tenter in the width direction of the film and then heat-treated at a temperature of 260° C. for 10 seconds. Thereafter, the resulting film was relaxed by 4% in the transverse direction in a cooling zone maintained at 150° C. and then cooled to room temperature, followed by removing film edges, whereby a biaxially oriented PPS film of 125 µm in thickness was prepared. As shown in the results of measurement and evaluation of the structure and properties of the resulting biaxially oriented PPS film in Table 1, this biaxially oriented polyphenylene sulfide film was a film poor in tensile elongation and molding processability.

[Table 1]

TABLE 1

| | Content of polyarylene sulfide (parts by weight) | Thermoplastic resin A | Content of thermoplastic resin A (parts by weight) | Average particle diameter (dispersed phase) (nm) | Tensile elongation at break MD/TD (%) | Tensile strength at break MD/TD (MPa) | Peak temperature at loss tangent of dynamic viscoelasticity (° C.) | Crystal melting heat quantity (J/g) | Molding processability |
|---|---|---|---|---|---|---|---|---|---|
| Example 1 | 90 | PA-1 | 10 | 80 | 160/180 | 280/230 | 124 | 32 | Excellent |
| Example 2 | 75 | PA-1 | 25 | 250 | 110/125 | 210/170 | 118 | 25 | Good |
| Example 3 | 95 | PA-1 | 5 | 80 | 120/135 | 280/240 | 126 | 34 | Good |
| Example 4 | 90 | PA-2 | 10 | 120 | 135/150 | 270/220 | 127 | 32 | Excellent |
| Example 5 | 90 | PA-3 | 10 | 220 | 90/115 | 250/220 | 132 | 33 | Good |
| Example 6 | 90 | PA-1 | 10 | 280 | 110/125 | 250/215 | 128 | 33 | Good |
| Example 7 | 90 | PA-1 | 10 | 330 | 95/130 | 240/210 | 137 | 34 | Acceptable |
| Example 8 | 90 | PA-1 | 10 | 70 | 170/180 | 250/220 | 120 | 32 | Good |
| Example 9 | 90 | PA-4 | 10 | 60 | 170/180 | 220/200 | 124 | 32 | Good |
| Example 10 | 90 | PA-4 | 10 | 60 | 180/180 | 200/200 | 120 | 35 | Good |
| Example 11 | 90 | PA-4 | 10 | 60 | 180/190 | 190/170 | 118 | 35 | Excellent |
| Example 12 | 90 | PA-4 | 10 | 60 | 185/195 | 200/180 | 116 | 33 | Excellent |
| Example 13 | 95 | PA-4 | 5 | 60 | 165/175 | 220/200 | 123 | 38 | Good |
| Example 14 | 90 | PEI | 10 | 170 | 130/140 | 260/230 | 131 | 31 | Good |
| Example 15 | 90 | PSF | 10 | 270 | 115/135 | 240/220 | 133 | 31 | Good |
| Example 16 | 90 | PES | 10 | 280 | 110/125 | 230/210 | 133 | 30 | Good |
| Example 17 | 90 | PEI | 10 | 150 | 140/150 | 240/220 | 127 | 33 | Good |
| Example 18 | 90 | PSF | 10 | 230 | 125/145 | 230/220 | 128 | 32 | Good |
| Example 19 | 90 | PES | 10 | 230 | 130/135 | 230/215 | 128 | 32 | Good |
| Comparative Example 1 | 100 | — | 0 | — | 70/90 | 300/250 | 137 | 38 | Not acceptable |
| Comparative Example 2 | 90 | PA-1 | 10 | 650 | 65/85 | 150/130 | 136 | 32 | Not acceptable |
| Comparative Example 3 | 90 | PA-1 | 10 | 570 | 75/90 | 160/130 | 136 | 33 | Not acceptable |
| Comparative Example 4 | 90 | PA-1 | 10 | 530 | 65/80 | 180/135 | 138 | 33 | Not acceptable |
| Comparative Example 5 | 90 | PA-1 | 10 | 720 | 50/75 | 130/120 | 139 | 34 | Not acceptable |
| Comparative Example 6 | 90 | PA-1 | 10 | 1200 | 30/50 | 115/90 | 140 | 35 | Not acceptable |
| Comparative Example 7 | 65 | PA-1 | 35 | 400 | 85/95 | 170/140 | 115 | 22 | Not acceptable |
| Comparative Example 8 | 55 | PA-1 | 45 | 510 | 65/80 | 165/125 | 128 | 33 | Not acceptable |
| Comparative Example 9 | 99.5 | PA-1 | 0.5 | 50 | 65/90 | 280/235 | 136 | 38 | Not acceptable |
| Comparative Example 10 | 90 | PA-4 | 10 | 60 | 70/75 | 280/260 | 120 | 55 | Not acceptable |
| Comparative Example 11 | 90 | PA-4 | 10 | 60 | 60/90 | 280/250 | 137 | 37 | Not acceptable |
| Comparative Example 12 | 90 | PA-4 | 10 | 60 | 80/60 | 290/240 | 136 | 40 | Not acceptable |

(Note)
MD (longitudinal direction of film)
TD (width direction of film)

Example 20

An unstretched film obtained in the same manner as in Example 1 was stretched at a temperature of 103° C. and a draw ratio of 3.0 in the longitudinal direction of the film by using a difference in rotation speed between rolls in a stretching machine including a plurality of groups of heated rolls. Thereafter, both ends of the resulting film were retained with clips and the film was stretched at a stretching temperature of 105° C. and a draw ratio of 3.5 with a tenter in the width direction of the film and subjected to heat treatment at the first stage at a temperature of 240° C. for 2 seconds and then to heat treatment at the second stage at a temperature of 260° C. for 2 seconds. Thereafter, the resulting film was relaxed by 4% in the transverse direction in a cooling zone maintained at 150° C. and then cooled to room temperature, followed by removing film edges, whereby a biaxially oriented PPS sheet of 100 μm in thickness was prepared.

This biaxially oriented PPS film and the non-oriented PPS sheet obtained in Reference Example 5 were laminated by a press roll at a temperature of 240° C. at a pressure of 10 kg/cm², to constitute a 3-layer laminate composed of the biaxially oriented polyphenylene sulfide (layer a)/non-oriented polyphenylene sulfide (layer b)/biaxially oriented polyphenylene sulfide (layer a) (100/50/100 (μm)).

As shown in the results of measurement and evaluation of the structure and properties of the resulting laminated PPS sheet in Table 2, this sheet was excellent in tensile elongation and molding processability.

Examples 21 and 22

A laminated polyphenylene sulfide sheet was obtained in the same manner as in Example 20 except that the amount of PA-1 added as thermoplastic resin A was changed as shown in Table 1 to give a biaxially oriented polyphenylene sulfide sheet. As shown in the results of measurement and evaluation of the structure and properties of the resulting laminated polyphenylene sulfide sheet in Table 2, this laminated polyphenylene sulfide film was excellent in tensile elongation and molding processability.

Example 23

A laminated polyphenylene sulfide film was obtained in the same manner as in Example 20 except that nylon 6 (CM1001 manufactured by Toray Industries, Inc.) (polyamide-2 (PA-2)) was used as thermoplastic resin A to give a biaxially oriented polyphenylene sulfide sheet. As shown in the results of measurement and evaluation of the structure and properties of the resulting laminated polyphenylene sulfide sheet in Table 2, this laminated polyphenylene sulfide sheet was excellent in tensile elongation and molding processability.

Example 24

A laminated polyphenylene sulfide sheet was obtained in the same manner as in Example 20 except that nylon 12

(CM5051 manufactured by Toray Industries, Inc.) (polyamide-3 (PA-3)) was used as thermoplastic resin A to give a biaxially oriented polyphenylene sulfide sheet. As shown in the results of measurement and evaluation of the structure and properties of the resulting laminated polyphenylene sulfide sheet in Table 2, this laminated polyphenylene sulfide sheet was excellent in tensile elongation and molding processability.

Example 25

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 325° C. The mixture was melt-extruded into strands at a screw speed of 300 rpm and a residence time of 90 seconds, then cooled with water at a temperature of 25° C. and immediately cut into blend chips. Thereafter, an unstretched film was prepared in the same manner as in Example 20. This unstretched film was formed into a biaxially oriented polyphenylene sulfide sheet in the same method as in Example 20, and a laminated polyphenylene sulfide sheet was obtained in the same manner as in Example 20.

As shown in the results of measurement and evaluation of the structure and properties of the resulting laminated polyphenylene sulfide sheet in Table 2, this laminated polyphenylene sulfide sheet was satisfactory in molding processability.

Example 26

An unstretched film was obtained in the same manner as in Example 9 was obtained in the same manner as in Example 9 except that nylon 610 (Amilan CM2001, manufactured by Toray Industries, Inc.) (polyamide-4 (PA-4)) was used as thermoplastic resin A. Thereafter, a laminated polyphenylene sulfide sheet was obtained in the same manner as in Example 20. As shown in the results of measurement and evaluation of the structure and properties of the resulting laminated polyphenylene sulfide sheet in Table 2, this laminated polyphenylene sulfide sheet was excellent in tensile elongation and molding processability.

Example 27

The biaxially oriented PPS film containing 10 wt % nylon 610 obtained in Example 12 and the non-oriented PPS sheet obtained in Reference Example 5 were laminated by a press roll at a temperature of 240° C. at a pressure of 10 kg/cm$^2$, to constitute a 3-layer laminate composed of the biaxially oriented polyphenylene sulfide (layer a)/non-oriented polyphenylene sulfide (layer b)/biaxially oriented polyphenylene sulfide (layer a).

As shown in the results of measurement and evaluation of the structure and properties of the resulting laminated PPS sheet in Table 2, this sheet was excellent in tensile elongation and molding processability.

Example 28

A laminated polyphenylene sulfide sheet was obtained in the same manner as in Example 20 except that polyether imide (PEI) (Ultem 1001, produced by GE Plastics) (glass transition temperature 215° C.) was used as thermoplastic resin A. As shown in the results of measurement and evaluation of the structure and properties of the resulting laminated polyphenylene sulfide sheet in Table 2, this biaxially oriented polyphenylene sulfide film was excellent in tensile elongation and molding processability.

Example 29

A laminated polyphenylene sulfide sheet was obtained in the same manner as in Example 20 except that polysulfone (PSF) (UDEL, produced by Amoco) (glass transition temperature 190° C.) was used as thermoplastic resin A. As shown in the results of measurement and evaluation of the structure and properties of the resulting laminated polyphenylene sulfide sheet in Table 2, this laminated polyphenylene sulfide sheet was excellent in tensile elongation and molding processability.

Example 30

A laminated polyphenylene sulfide sheet was obtained in the same manner as in Example 20 except that polyether sulfone (PES) (RADEL, produced by Amoco) (glass transition temperature 225° C.) was used as thermoplastic resin A. As shown in the results of measurement and evaluation of the structure and properties of the resulting laminated polyphenylene sulfide sheet in Table 2, this biaxially oriented polyphenylene sulfide film was excellent in tensile elongation and molding processability.

Example 31

The copolymerized PPS composition obtained in Reference Example 2 and resin X obtained in Example 1 were dried respectively at 180° C. for 3 hours under reduced pressure at 1 mmHg, and 0.3 wt % calcium carbonate powder having an average particle diameter of 1.2 µm and 0.05 wt % calcium stearate were uniformly dispersed in and blended with resin X. Thereafter, the copolymerized PPS composition and the blend resin X were fed to different extruders respectively, melted at 310° C., filtered with a 95%-cutting filter of pore diameter of 100 µm using a metal fiber, and then the discharge rate was regulated with a lamination device in an upper part of a die so as to form a 2-layer laminate of resin X/copolymerized PPS (1,210 µm/110 µm), from which a non-oriented PPS sheet of 1,320 µm in thickness was then obtained in the same manner as in production of the non-oriented polyphenylene sulfide sheet in Reference Example 4. This non-oriented PPS sheet was stretched in the same manner as in Example 20 to produce a biaxially oriented polyphenylene sulfide film of 125 µm in thickness consisting of resin X/copolymerized PPS (PPS-2) (115 µm/10 µm).

The biaxially oriented polyphenylene sulfide films were laminated with each other at the side of the copolymerized PPS film in the same manner as in Example 20, to give a laminated polyphenylene sulfide sheet consisting of the polyphenylene sulfide layer (layer a)/copolymerized PPS (layer c)/polyphenylene sulfide layer (layer a) (115/20/115 (µm)).

As shown in the results of measurement and evaluation of the structure and properties of the resulting laminated polyphenylene sulfide sheet in Table 2, this sheet was excellent in tensile elongation and molding processability.

Example 32

A laminated polyphenylene sulfide sheet (polyphenylene sulfide layer (layer a)/copolymerized PPS (layer c)/polyphenylene sulfide layer (layer a) (105/40/105 (μm))) was obtained in the same manner as in Example 31 except that the non-oriented polyphenylene sulfide sheet was made of a 2-layer laminate of resin X/copolymerized PPS (PPS-2) (1,100 μm/210 μm), and a biaxially oriented polyphenylene sulfide film consisting of resin X/copolymerized PPS (105 μm/20 μm) was used.

As shown in the results of measurement and evaluation of the structure and properties of the resulting laminated polyphenylene sulfide sheet in Table 2, this sheet was excellent in tensile elongation and molding processability.

Example 33

The copolymerized PPS composition obtained in Reference Example 2 and resin Z obtained in Example 9 were dried respectively at 180° C. for 3 hours under reduced pressure at 1 mmHg, and 0.3 wt % calcium carbonate powder having an average particle diameter of 1.2 μm and 0.05 wt % calcium stearate were uniformly dispersed in and blended with resin Z. Thereafter, the copolymerized PPS composition and the blend resin Z were fed to different extruders respectively, melted at 310° C., filtered with a 95%-cutting filter of pore diameter of 100 μm using a metal fiber, and then the discharge rate was regulated with a lamination device in an upper part of a die so as to form a 2-layer laminate of resin Z/copolymerized PPS (PPS-2) (1,110 μm/210 μm), from which a non-oriented PPS sheet of 1,320 μm in thickness was then obtained in the same manner as in production of the non-oriented polyphenylene sulfide sheet in Reference Example 4. This non-oriented PPS sheet was stretched in the same manner as in Example 20 to produce a biaxially oriented polyphenylene sulfide film of 125 μm in thickness consisting of resin Z (layer a)/copolymerized PPS (layer c) (105 μm/20 μm).

The biaxially oriented polyphenylene sulfide films were laminated with each other at the side of the copolymerized PPS film in the same manner as in Example 20, to give a laminated polyphenylene sulfide sheet (polyphenylene sulfide layer (layer a)/copolymerized PPS (layer c)/polyphenylene sulfide layer (layer a) (105/40/105 (μm))).

As shown in the results of measurement and evaluation of the structure and properties of the resulting laminated polyphenylene sulfide sheet in Table 2, this sheet was excellent in tensile elongation and molding processability.

Example 34

An unstretched sheet obtained in the same manner as in Example 33 was subjected to biaxial stretching in the same manner as in Example 12 to produce a biaxially oriented polyphenylene sulfide film of 125 μm in thickness consisting of resin Z (layer a)/copolymerized PPS (PPS-2) (layer c) (105 μm/20 μm). The biaxially oriented polyphenylene sulfide films were laminated with each other at the side of the copolymerized PPS film in the same manner as in Example 20, to give a laminated polyphenylene sulfide sheet (polyphenylene sulfide layer (layer a)/copolymerized PPS (layer c)/polyphenylene sulfide layer (layer a) (105/40/105 (μm))).

As shown in the results of measurement and evaluation of the structure and properties of the resulting laminated polyphenylene sulfide sheet in Table 2, this sheet was excellent in tensile elongation and molding processability.

Example 35

An unstretched sheet obtained in the same manner as in Example 33 was subjected to biaxial stretching in the same manner as in Example 12 to produce a biaxially oriented polyphenylene sulfide film of 125 μm in thickness consisting of resin Z (layer a)/copolymerized PPS (PPS-2) (layer c) (100 μm/25 μm). The copolymerized PPS layer (layer c) of this laminated biaxially oriented polyphenylene sulfide film was laminated in the same manner as in Example 20 with a biaxially stretched PPS film (layer a) of 100 μm in thickness obtained in the same manner as in Example 12, to give a laminated polyphenylene sulfide sheet (polyphenylene sulfide layer (layer a)/copolymerized PPS (layer c)/polyphenylene sulfide layer (layer a) (100/25/100 (μm))).

As shown in the results of measurement and evaluation of the structure and properties of the resulting laminated polyphenylene sulfide sheet in Table 2, this sheet was excellent in tensile elongation and molding processability.

Example 36

A laminated polyphenylene sulfide sheet (polyphenylene sulfide layer (layer a)/copolymerized PPS (PPS-2) (layer c)/polyphenylene sulfide layer (layer a) (100/25/100 (μm))) was obtained in the same manner as in Example 35 except that the thermocompression bonding temperature was 255° C.

As shown in the results of measurement and evaluation of the structure and properties of the resulting laminated polyphenylene sulfide sheet in Table 2, this sheet was excellent in tensile elongation and molding processability.

Example 37

A laminated polyphenylene sulfide sheet (polyphenylene sulfide layer (layer a)/copolymerized PPS (PPS-2) (layer c)/polyphenylene sulfide layer (layer a) (100/25/100 (μm))) was obtained in the same manner as in Example 35 except that nylon 610 (PA-4) was used as thermoplastic resin A and added in an amount of 5 parts by weight.

As shown in the results of measurement and evaluation of the structure and properties of the resulting laminated polyphenylene sulfide sheet in Table 2, this sheet was excellent in tensile elongation and molding processability.

Example 38

A laminated polyphenylene sulfide sheet (polyphenylene sulfide layer (layer a)/copolymerized PPS (layer c)/polyphenylene sulfide layer (layer a) (100/25/100 (μm))) was obtained in the same manner as in Example 35 except that the copolymerized PPS (PPS-3) obtained in Reference Example 3 was used as the copolymerized PPS layer, and the thermocompression bonding temperature was 270° C. As shown in the results of measurement and evaluation of the structure and properties of the resulting laminated polyphenylene sulfide sheet in Table 2, this sheet was excellent in tensile elongation and molding processability.

Example 39

A biaxially oriented PPS film of 85 μm in thickness was obtained in the same manner as in Example 20. The resulting biaxially oriented PPS film and the non-oriented PPS sheet of 70 μm in thickness obtained in Reference Example 6 were laminated by a press roll at a temperature of 240° C. at a pressure of 10 kg/cm², to constitute a 3-layer laminate composed of the biaxially oriented polyphenylene sulfide (layer a)/non-oriented polyphenylene sulfide (layer b)/biaxially oriented polyphenylene sulfide (layer a) (a/b/a=90/70/90 (μm)).

As shown in the results of measurement and evaluation of the structure and properties of the resulting laminated PPS sheet in Table 2, this sheet was satisfactory in respect of molding processability.

Comparative Example 13

A biaxially oriented PPS film was prepared in the same manner as in Example 20 and a laminated polyphenylene sulfide sheet was obtained in the same manner as in Example 20, except that only the PPS resin prepared in Reference Example 1 was used and this resin was used as the outermost layer.

As shown in the results of measurement and evaluation of the structure and properties of the resulting laminated polyphenylene sulfide sheet in Table 2, this laminated polyphenylene sulfide sheet was a sheet poor in tensile elongation and molding processability.

Comparative Example 14

A biaxially oriented PPS film was prepared in the same manner as in Example 20 and a laminated polyphenylene sulfide sheet was obtained in the same manner as in Example 20, except that the compatibilizing agent was not added to the raw material of the biaxially oriented polyphenylene sulfide sheet.

As shown in the results of measurement and evaluation of the structure and properties of the resulting laminated polyphenylene sulfide sheet in Table 2, this laminated polyphenylene sulfide sheet was a sheet poor in tensile elongation and molding processability.

Comparative Example 15

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a vented co-rotating twin-screw extruder (a screw diameter of 30 mm and a screw length/screw diameter ratio of 45.5, manufactured by Japan Steel Works, Ltd.) including 3 kneading paddling zones heated to 310° C. The mixture was melt-extruded into strands at a screw speed of 80 rpm and a residence time of 90 seconds, then cooled with water at a temperature of 25° C. and immediately cut into blend chips. Thereinafter, a biaxially oriented PPS film of 125 μm in thickness was obtained in the same manner as in Example 20, and a laminated polyphenylene sulfide sheet was obtained in the same manner as in Example 20.

The resulting laminated polyphenylene sulfide sheet, as shown in the results of measurement and evaluation of the properties thereof in Table 2, was a film poor in tensile elongation and molding processability.

Comparative Example 16

90 parts by weight of the PPS resin prepared in Reference Example 1 were dried at 180° C. for 3 hours under reduced pressure, and as thermoplastic resin A, 10 parts by weight of nylon 6/66 copolymer (PA-1) prepared in Reference Example 4 were dried at 120° C. for 3 hours under reduced pressure. Then, 2 parts by weight of bisphenol A type epoxy resin (Epikote 1004, manufactured by Yuka Shell Epoxy Co., Ltd.) were incorporated as a compatibilizing agent into 100 parts by weight of the PPS resin and the nylon 6/66 copolymer in total. Thereafter, the mixture was fed to a full-flight single-screw extruder heated at 310° C. (screw diameter 40 mm, manufactured by Tanabe Plastics Machinery Co., Ltd) and melt-extruded into strands at a screw speed of 80 rpm and a residence time of 90 seconds, then cooled with water at a temperature of 25° C. and immediately cut into blend chips. Thereinafter, a biaxially oriented PPS film of 125 μm in thickness was obtained in the same manner as in Example 20, and a laminated polyphenylene sulfide sheet was obtained in the same manner as in Example 20.

The resulting biaxially oriented polyphenylene sulfide film, as shown in the results of measurement and evaluation of the properties thereof sheet in Table 2, was a film poor in tensile elongation and molding processability.

Comparative Examples 17 to 19

A laminated polyphenylene sulfide sheet was obtained in the same manner as in Example 20 except that the amount of PA-1 added as thermoplastic resin A was changed as shown in Table 2. As shown in the results of measurement and evaluation of the structure and properties of the resulting laminated polyphenylene sulfide sheet in Table 2, this biaxially oriented polyphenylene sulfide sheet was a film poor in tensile elongation and molding processability.

Comparative Example 20

A biaxially oriented PPS film of 85 μm in thickness was obtained in the same manner as in Example 20. The resulting biaxially oriented PPS film and the non-oriented PPS sheet obtained in Reference Example 7 were laminated by a press roll at a temperature of 240° C. at a pressure of 10 kg/cm², to constitute a 3-layer laminate composed of the biaxially oriented polyphenylene sulfide (layer a)/non-oriented polyphenylene sulfide (layer b)/biaxially oriented polyphenylene sulfide (layer a) (a/b/a=85/80/85 (μm)).

The results of measurement and evaluation of the structure and properties of the resulting laminated PPS sheet are shown in Table 2.

Comparative Example 21

A biaxially oriented PPS film of 65 μm in thickness was obtained in the same manner as in Example 20. The resulting biaxially oriented PPS film and the non-oriented PPS sheet of 120 μm in thickness obtained in Reference Example 8 were laminated by a press roll at a temperature of 240° C. at a pressure of 10 kg/cm², to constitute a 3-layer laminate composed of the biaxially oriented polyphenylene sulfide (layer a)/non-oriented polyphenylene sulfide (layer b)/biaxially oriented polyphenylene sulfide (layer a) (65/120/65 (μm)).

The results of measurement and evaluation of the structure and properties of the resulting laminated PPS sheet are shown in Table 2. This sheet was poor in tensile elongation and molding processability.

TABLE 2

| | Outermost layer | | | | Laminated sheet | | |
|---|---|---|---|---|---|---|---|
| | Content of polyarylene sulfide (parts by weight) | Thermoplastic resin A | Content of thermoplastic resin A (parts by weight) | Average particle diameter (dispersed phase) (nm) | Thickness of layer other than outermost layer/all layers (%) | Tensile elongation at break MD/TD (%) | Impact strength (N/μm) | Molding processability |
|---|---|---|---|---|---|---|---|---|
| Example 20 | 90 | PA-1 | 10 | 80 | 20 | 160/180 | 5 | Excellent |
| Example 21 | 75 | PA-1 | 25 | 250 | 20 | 110/125 | 4 | Good |
| Example 22 | 95 | PA-1 | 5 | 80 | 20 | 120/130 | 4 | Good |
| Example 23 | 90 | PA-2 | 10 | 120 | 20 | 135/150 | 5 | Excellent |
| Example 24 | 90 | PA-3 | 10 | 220 | 20 | 90/115 | 3 | Good |
| Example 25 | 90 | PA-1 | 10 | 280 | 20 | 110/125 | 4 | Good |
| Example 26 | 90 | PA-4 | 10 | 60 | 20 | 145/155 | 4 | Good |
| Example 27 | 90 | PA-4 | 10 | 60 | 20 | 170/180 | 5 | Excellent |
| Example 28 | 90 | PEI | 10 | 170 | 20 | 130/140 | 4 | Good |
| Example 29 | 90 | PSF | 10 | 270 | 20 | 115/135 | 5 | Good |
| Example 30 | 90 | PES | 10 | 280 | 20 | 110/125 | 4 | Good |
| Example 31 | 90 | PA-1 | 10 | 80 | 8 | 105/115 | 4 | Good |
| Example 32 | 90 | PA-1 | 10 | 80 | 16 | 110/115 | 4 | Excellent |
| Example 33 | 90 | PA-4 | 10 | 60 | 16 | 150/160 | 4 | Excellent |
| Example 34 | 90 | PA-4 | 10 | 60 | 16 | 170/175 | 5 | Excellent |
| Example 35 | 90 | PA-4 | 10 | 60 | 11 | 170/170 | 4 | Excellent |
| Example 36 | 90 | PA-4 | 10 | 60 | 11 | 180/190 | 6 | Excellent |
| Example 37 | 95 | PA-4 | 5 | 60 | 11 | 155/160 | 5 | Excellent |
| Example 38 | 90 | PA-4 | 10 | 60 | 11 | 145/160 | 4 | Good |
| Example 39 | 90 | PA-1 | 10 | 80 | 28 | 105/110 | 3 | Acceptable |
| Comparative Example 13 | 100 | — | 0 | — | 20 | 60/70 | 2 | Not acceptable |
| Comparative Example 14 | 90 | PA-1 | 10 | 650 | 20 | 65/90 | 2 | Not acceptable |
| Comparative Example 15 | 90 | PA-1 | 10 | 570 | 20 | 75/90 | 1 | Not acceptable |
| Comparative Example 16 | 90 | PA-1 | 10 | 720 | 20 | 50/75 | 2 | Not acceptable |
| Comparative Example 17 | 65 | PA-1 | 35 | 400 | 20 | 85/95 | 3 | Not acceptable |
| Comparative Example 18 | 55 | PA-1 | 45 | 510 | 20 | 65/80 | 2 | Not acceptable |
| Comparative Example 19 | 99.5 | PA-1 | 0.5 | 50 | 20 | 65/90 | 1 | Not acceptable |
| Comparative Example 20 | 90 | PA-1 | 10 | 80 | 32 | 70/75 | 3 | Not acceptable |
| Comparative Example 21 | 90 | PA-1 | 10 | 80 | 48 | 50/55 | 1 | Not acceptable |

(Note)
MD (longitudinal direction of film)
TD (width direction of film)

INDUSTRIAL APPLICABILITY

The biaxially oriented polyarylene sulfide film of the present invention or the laminated polyarylene sulfide sheet comprising the same can be preferably used in applications to various industrial materials, for example an electrical insulating material for a motor, a transformer, an insulated cable etc., a molding material, a circuit board material, a step/release film for circuit/optical element etc., a lithium ion battery material, a fuel battery material, a speaker diaphragm, etc. More specifically, it can be preferably used in an electrical insulating material for a hot-water supplier motor, a motor for car air conditioner and a driving motor used in a hybrid car, and a speaker diaphragm for cell-phone.

The invention claimed is:

1. A biaxially oriented polyphenylene sulfide film comprising polyphenylene sulfide and polyether imide, wherein the contents of the polphenylene sulfide and the polyether imide are 70 to 99 parts by weight and 1 to 30 parts by weight respectively when the total amount of the polyphenylene sulfide and the polyether imide is taken as 100 parts by weight, and further comprising a compound having one or more groups selected from an epoxy group and an isocyanate group as a compatibilizing agent in an amount of 0.1 to 10 parts by weight based on 100 parts by weight of the polyphenylene sulfide and polyether imide in total, and the polyether imide forms a dispersed phase with an average particle diameter of 10 to 500 nm and the biaxially oriented polyphenylene sulfide film exhibits a tensile elongation at break of 110 to 250% in both the longitudinal direction and width direction.

2. The biaxially oriented polyphenylene sulfide film according to claim 1, wherein the crystal melting heat quantity of the polyphenylene sulfide is 20 to 45 (J/g).

3. The biaxially oriented polyphenylene sulfide film according to claim 1, wherein the primary dispersion peak temperature at loss tangent of dynamic viscoelasticity at a frequency of 1 Hz is 100 to 135 C.

* * * * *